United States Patent
Ezaki et al.

(10) Patent No.: US 8,166,523 B2
(45) Date of Patent: Apr. 24, 2012

(54) AUTHENTICATION PROCESSING SYSTEM, AUTHENTICATION PROCESSING METHOD, AUTHENTICATION DEVICE, AND COMPUTER PROGRAM

(75) Inventors: Tadashi Ezaki, Tokyo (JP); Akira Iga, Kanagawa (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 10/216,854

(22) Filed: Aug. 13, 2002

(65) Prior Publication Data

US 2003/0037264 A1 Feb. 20, 2003

(30) Foreign Application Priority Data

Aug. 15, 2001 (JP) ................................ P2001-246453

(51) Int. Cl.
*G06F 7/04* (2006.01)

(52) U.S. Cl. .................. 726/5; 726/2; 726/22; 713/155; 713/156; 713/157; 713/158; 713/159; 382/115; 380/247; 380/248; 380/249; 380/250; 705/18

(58) Field of Classification Search .................. 713/186, 713/155–159; 726/17, 2, 5, 22, 21; 382/115; 380/247–250; 705/18
See application file for complete search history.

(56) References Cited

U.S. PATENT DOCUMENTS

| | | | | |
|---|---|---|---|---|
| 5,917,913 | A * | 6/1999 | Wang | 705/67 |
| 6,088,802 | A * | 7/2000 | Bialick et al. | 726/3 |
| 6,487,662 | B1 * | 11/2002 | Kharon et al. | 713/186 |
| 6,751,734 | B1 * | 6/2004 | Uchida | 713/186 |
| 6,910,131 | B1 * | 6/2005 | Yamada et al. | 713/186 |
| 7,320,024 | B2 * | 1/2008 | Oku | 709/217 |
| 7,493,495 | B2 * | 2/2009 | Klinger et al. | 713/186 |
| 2001/0026632 | A1 * | 10/2001 | Tamai | 382/116 |
| 2001/0034704 | A1 * | 10/2001 | Farhat et al. | 705/39 |
| 2001/0034836 | A1 * | 10/2001 | Matsumoto et al. | 713/176 |
| 2002/0062284 | A1 * | 5/2002 | Kawan | 705/43 |
| 2002/0138768 | A1 * | 9/2002 | Murakami et al. | 713/202 |

FOREIGN PATENT DOCUMENTS

| | | |
|---|---|---|
| JP | 04-306760 A | 10/1992 |
| JP | 07-123086 A | 5/1995 |
| JP | 09-130375 A | 5/1997 |
| JP | 10-228524 A | 8/1998 |
| JP | 11-143833 A | 5/1999 |
| JP | 11-316818 | 11/1999 |

(Continued)

OTHER PUBLICATIONS

Japanese Office Action: Application No. 2001-246453; Dated: Sep. 4, 2007. Japanese Office Action issued Sep. 1, 2009 for corresponding Japanese Application No. 2001-246453.
Japanese Office Action issued Feb. 16, 2010 for corresponding Japanese Application No. 2001-246453.
Japanese Office Action issued May 11, 2010 for corresponding Japanese Application No. 2001-246453.

*Primary Examiner* — Edan Orgad
*Assistant Examiner* — Roderick Tolentino
(74) *Attorney, Agent, or Firm* — Rader, Fishman & Grauer PLLC

(57) ABSTRACT

An authentication device that the user wears reads biometrics information and executes individual authentication by verification. Only when the individual authentication has been successfully performed, authentication with an external unit (such as a server) can be started. Then, only when both the individual authentication based on the biometrics information and the mutual authentication between the external unit (such as a server) and the authentication device have been successfully performed, subsequent data processing, such as payment processing, can be executed. Therefore, even if a fraudulent third party uses a stolen authentication device, because the party cannot satisfy the start condition of authentication with the external server or a PC, fraudulent transactions and other illegitimate behaviors are effectively prevented.

11 Claims, 15 Drawing Sheets

FOREIGN PATENT DOCUMENTS

| | | |
|---|---|---|
| JP | 11-338985 A | 12/1999 |
| JP | 11-345266 A | 12/1999 |
| JP | 2000-067198 A | 3/2000 |
| JP | 2000-003337 | 7/2000 |
| JP | 2000-196588 | 7/2000 |
| JP | 2001-195368 A | 7/2001 |
| WO | WO-01/54074 A1 | 7/2001 |

* cited by examiner

FIG. 12
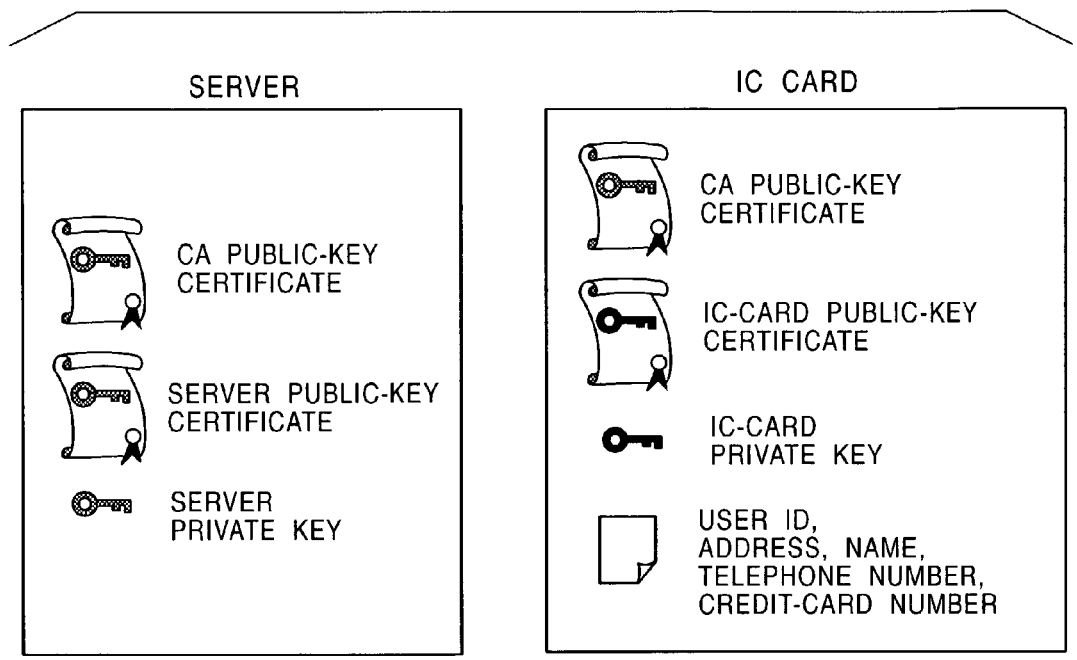
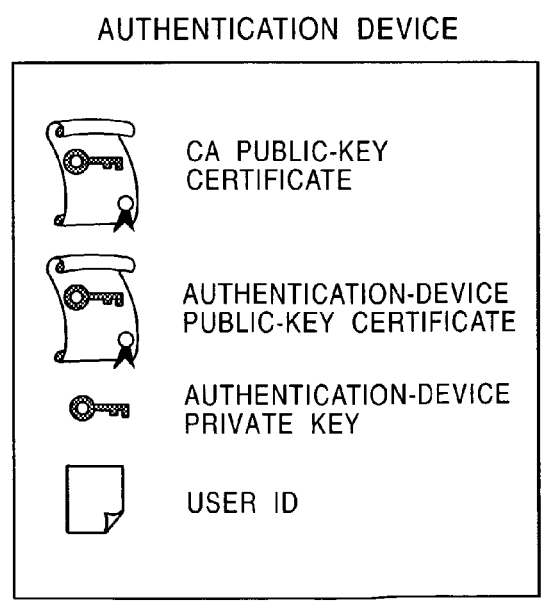

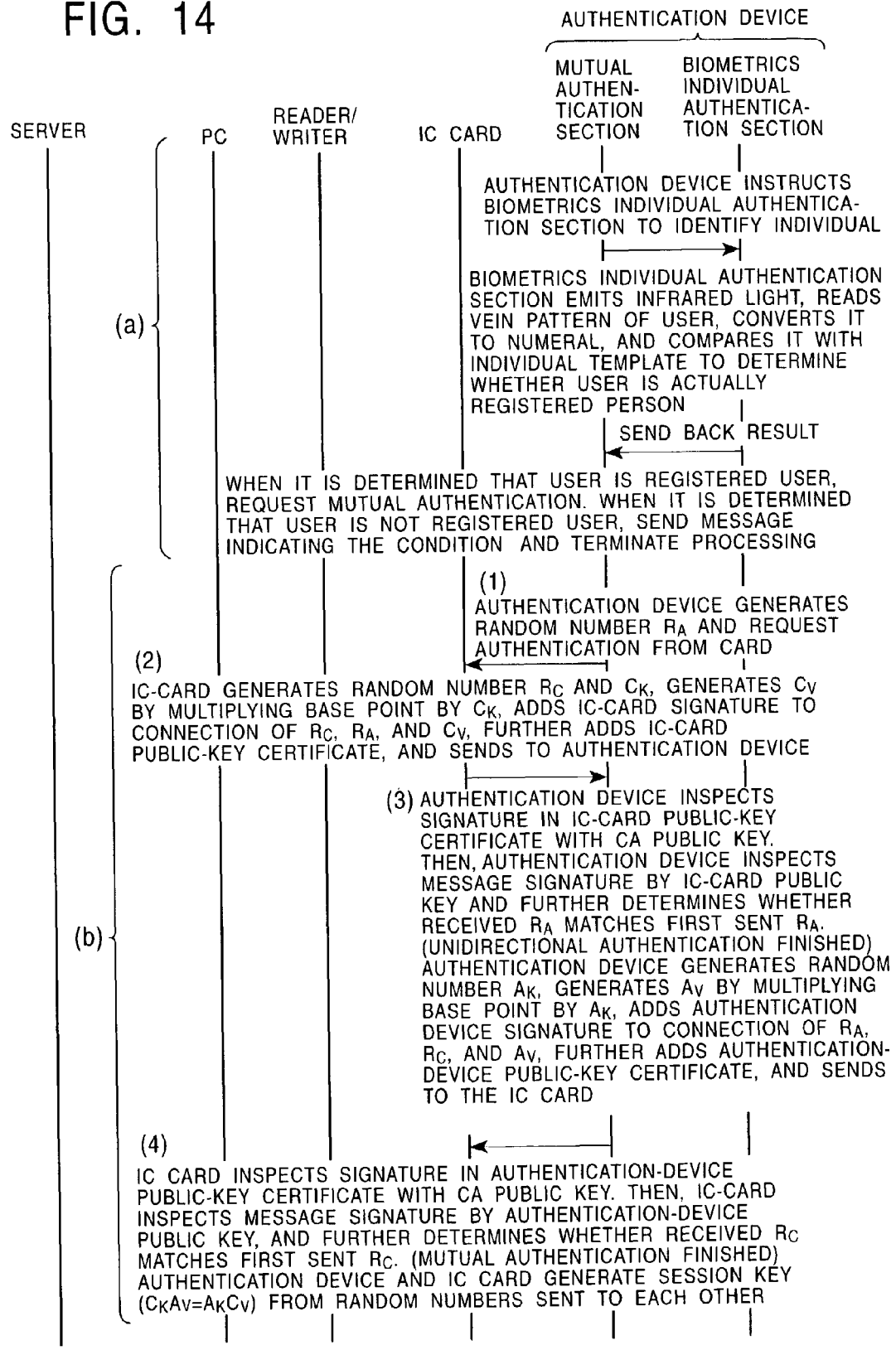

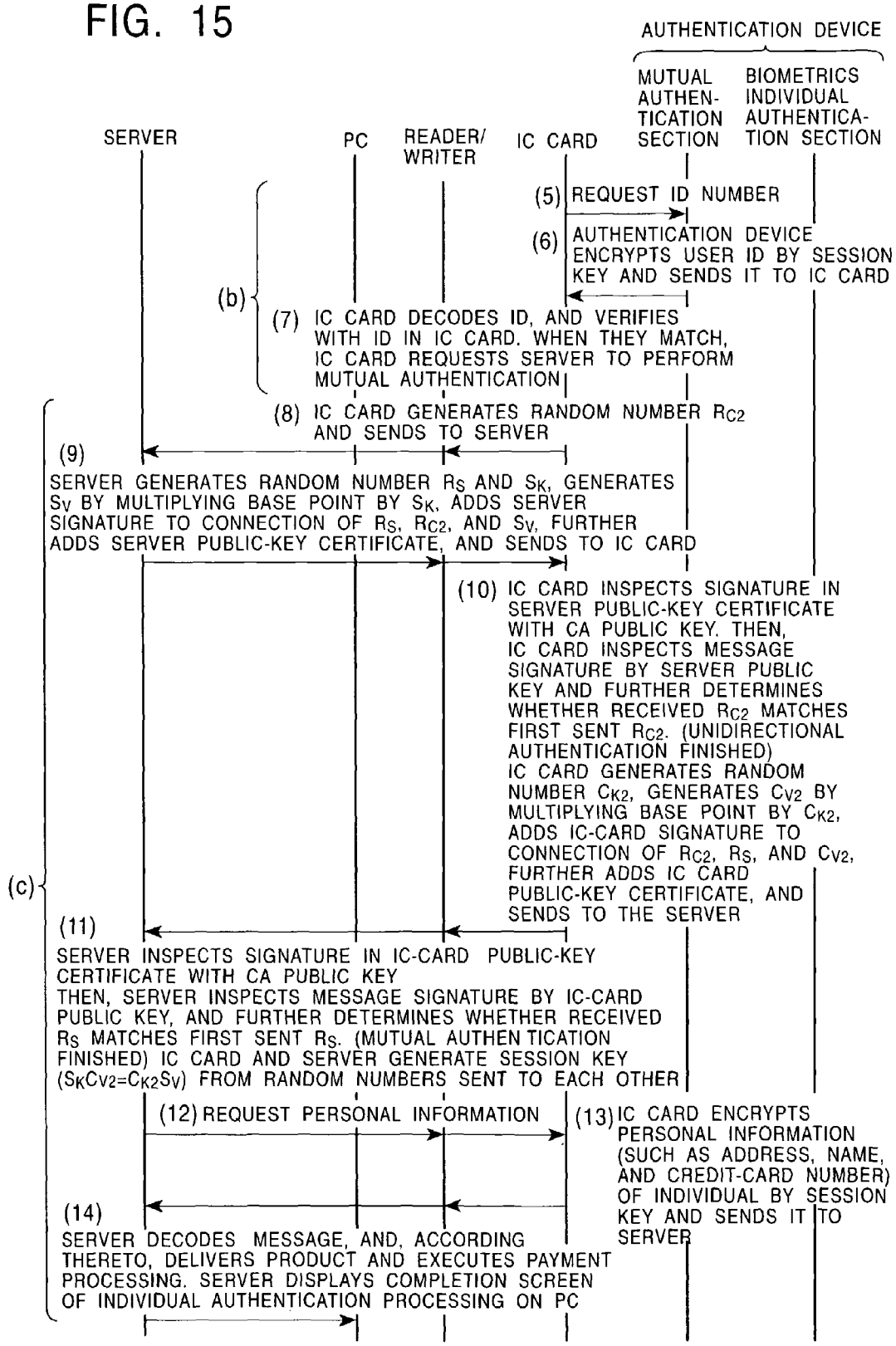

AUTHENTICATION PROCESSING SYSTEM, AUTHENTICATION PROCESSING METHOD, AUTHENTICATION DEVICE, AND COMPUTER PROGRAM

BACKGROUND OF THE INVENTION

1. Field of the Invention

The present invention relates to authentication processing systems, authentication processing methods, authentication devices, and computer programs and, more particularly, to an authentication processing system, an authentication processing method, an authentication device, and a computer program which use an authentication-function executing element mounted to a human body to execute individual authentication by using biometrics (living-body) information and to execute authentication by communication through the human body.

2. Description of the Related Art

Services for distributing various types of software data (hereinafter called a content), such as music data, image data, and game programs, through various types of wire and wireless communication networks, such as those through the Internet and satellites, have spread, and the use of electronic payment and electronic money has increased rapidly on the networks. In addition, many companies and many persons frequently store confidential documents in various storage media, such as hard disks and optical disks. It has been an important issue to ensure the security of such data transferred through the networks or stored in the various storage media.

There are various ways to ensure security. One of them is to restrict the use of a computer to legitimate users. Processing for determining a user is called individual authentication processing. In a typical method, user IDs and passwords are given to legitimate users in advance, and only those who input correct passwords are allowed to access data.

Currently, various problems occur, however, when each person manages the user ID and password. To enhance security, it is considered advantageous that a complicated password is generated, whereas it is difficult for a person to memorize a complicated password. It is possible to store a password in a storage apparatus, such as a hard disk, to help a human's storage capability. When a password is stored in such a storage apparatus, a third party may steal the password from the storage apparatus, and a safety problem arises.

In a method to solve a password-management issue, individual biometrics (living-body) information, such as an eyeground image or a fingerprint, is used to identify legitimate users. For example, living-body information of a legitimate user, such as code information obtained from the eyeground image of the user, is registered in a system in advance, and the user makes the system read the living-body information, such as eyeground information, before executing processing, such as payment processing, which requires individual authentication. Then, the system verifies the living-body information read from the user with the registered living-body information to determine whether the user is a legitimate already-registered user. This verification checks the legitimacy of the user.

In the process for checking the legitimacy of an individual by using biometrics (living-body) information, however, impersonation, that is, counterfeiting and duplication of biometrics information, may occur. Impersonation may be possible, for example, if fingerprint information is duplicated on artificial leather or rubber, and data is read from the leather or rubber by a fingerprint reading apparatus.

SUMMARY OF THE INVENTION

The present invention has been made in consideration of the foregoing situation. It is an object of the present invention to provide an authentication processing system, an authentication processing method, an authentication device, and a computer program which execute processing for checking the legitimacy of an individual by using biometrics (living-body) information, and, in addition, execute mutual authentication between units to perform definite authentication processing.

The foregoing object is achieved in one aspect of the present invention through the provision of an authentication processing system including an authentication device which can be mounted on a person to be authenticated, for obtaining biometrics information of the person to be authenticated at a portion where the authentication device is mounted and for executing individual authentication processing by the use of verification with registered biometrics information stored in a memory in advance, wherein the authentication device includes control means for executing authentication processing with an external unit; and only when individual authentication has been successfully performed according to biometrics information by the authentication device, authentication processing between the authentication device and an external unit is executed.

The authentication processing system may be configured such that the authentication device includes a contact for data communication through a human body, and the authentication device executes the authentication processing with the external unit by using data communication through the contact.

The authentication processing system may be configured such that the authentication device includes an electromagnetic-wave transmitting and receiving section for non-contact data communication; and, the authentication device executes the authentication processing with the external unit by using data communication through the electromagnetic-wave transmitting and receiving section.

The authentication processing system may be configured such that the biometrics information used in the individual authentication performed by the authentication device is blood vessel pattern information, and the authentication device includes blood-vessel-pattern reading means for reading blood-vessel patterns at a portion of the body of the person to be authenticated who wears on the authentication device.

The authentication processing system may be configured such that authentication processing between the authentication device and the external unit is executed by one of a public-key method and a common-key method, and the authentication device includes storage means for storing key data applied to the authentication method to be executed.

The authentication processing system may be configured such that the external unit is an IC card owned by the same user as that of the authentication device, for storing personal information of the user and a user ID, and only when the individual authentication has been successfully performed according to the biometrics information by the authentication device, mutual authentication processing between the authentication device and the IC card is executed, and only when the mutual authentication has been successfully performed, authentication processing is executed between the IC card and a second external unit.

The authentication processing system may be configured such that the authentication device includes a power supply structure driven by receiving an electromagnetic wave.

The foregoing object is achieved in another aspect of the present invention through the provision of an authentication processing method executed in an authentication device which can be mounted on a person to be authenticated, including a step of obtaining biometrics information of the person to be authenticated at a portion where the authentication device is mounted; a step of executing individual authentication processing by the use of verification with registered biometrics information stored in a memory of the authentication device; and an authentication processing step of executing authentication processing between the authentication device and an external unit only when the individual authentication has been successfully performed.

The authentication processing method may be configured such that the authentication device includes a contact for data communication through a human body, and the authentication device executes the authentication processing with the external unit by using data communication through the contact.

The authentication processing method may be configured such that the authentication device includes an electromagnetic-wave transmitting and receiving section for non-contact data communication, and the authentication device executes the authentication processing with the external unit by using data communication through the electromagnetic-wave transmitting and receiving section.

The authentication processing method may be configured such that the biometrics information used in the individual authentication performed by the authentication device is blood-vessel-pattern information, and the step of obtaining biometrics information reads blood-vessel patterns at a portion of the body of the person to be authenticated who wears the authentication device.

The authentication processing method may be configured such that authentication processing between the authentication device and the external unit is executed by one of a public-key method and a common-key method.

The authentication processing method may be configured such that the external unit is an IC card for storing personal information of the user and a user ID owned by the same user as that of the authentication device; only when the individual authentication has been successfully performed according to the biometrics information by the authentication device, mutual authentication processing between the authentication device and the IC card is executed; and further, only when the mutual authentication has been successfully performed, authentication processing is executed between the IC card and a second external unit.

The foregoing object is achieved in still another aspect of the present invention through the provision of an authentication device capable of being mounted on a person to be authenticated, for obtaining biometrics information of the person to be authenticated at a portion where the authentication device is mounted and for executing individual authentication processing by the use of verification with registered biometrics information stored in a memory in advance, including control means for executing authentication processing with an external unit.

The authentication device may further include a contact for data communication through a human body and execute the authentication processing with the external unit by using data communication through the contact.

The authentication device may further include an electromagnetic-wave transmitting and receiving section for non-contact data communication and execute the authentication processing with the external unit by using data communication through the electromagnetic-wave transmitting and receiving section.

The authentication device may further include blood-vessel-pattern reading means for reading blood-vessel patterns at a portion of the body of the person to be authenticated who wears the authentication device.

The authentication device may further include storage means for storing key data applied to one of a public-key authentication method and a common-key authentication method.

The authentication device may further include a power supply structure driven by receiving an electromagnetic wave.

The foregoing object is achieved in yet another aspect of the present invention through the provision of a computer program for executing authentication processing on a computer system, including a step of obtaining biometrics information of a person to be authenticated at a portion where an authentication device is mounted; a step of executing individual authentication processing by the use of verification with registered biometrics information stored in a memory of the authentication device, and an authentication processing step of executing authentication processing between the authentication device and an external unit only when the individual authentication has been successfully performed.

A computer program according to the present invention can be provided, for example, for general-purpose computer systems which can execute various program codes through storage media, such as CDs, FDs, and MOs, or through communication media, such as networks, in computer readable formats. When the program is provided in a computer readable format for a computer system, processing is executed according to the program.

As described above, according to a structure of the present invention, an authentication device that the user wears first reads biometrics information and executes individual authentication by verification. Only when the individual authentication has been successfully performed according to the biometrics information, authentication with an external unit (such as a server) can be started. Then, only when both the individual authentication based on the biometrics information and the mutual authentication between the external unit (such as a server) and the authentication device have been successfully performed, subsequent data processing, such as payment processing, can be executed. Therefore, even if a fraudulent third party uses a stolen authentication device, because the party cannot satisfy the start condition of authentication with the external server or a PC, fraudulent transactions and other illegitimate behaviors are effectively prevented.

In addition, according to another structure of the present invention, in which an IC card which stores personal information is used, only when all authentications have been successfully performed, which includes individual authentication based on biometrics information, mutual authentication between the IC card and an authentication device, and mutual authentication between the IC card and an external unit (such as a server), subsequent data processing, such as payment processing, is executed. Therefore, even if a fraudulent third party uses a stolen authentication device or obtains illegitimately an IC card, which stores personal information, because the party cannot satisfy the start condition of authentication with the external server or a PC, fraudulent transactions and other illegitimate behaviors are effectively prevented. Even if an IC card which stores various types of personal information is lost, because subsequent processing is started only when individual authentication executed by the authentication device and mutual authentication between the IC card and the authentication device have been successfully performed, illegitimate processing by using the lost IC card is not executed, and IC-card management having a high security level is implemented.

Other objects, features, and advantages of the present invention will be made clear from embodiments of the present invention, described later, and detailed descriptions based of the accompanying drawings. In the present specification, a system refers to a logical assembly of a plurality of apparatuses, and it is not limited to a system having apparatuses in the same cabinet.

BRIEF DESCRIPTION OF THE DRAWINGS

FIG. 12 is a view showing information stored in each unit when public-key-method authentication processing is executed in an authentication system in which an IC card intervenes, according to the present invention.

FIG. 14 is a view showing another sequence of the public-key-method authentication processing in the authentication processing system in which the IC card intervenes, according to the present invention.

FIG. 15 is a view showing still another sequence of the public-key-method authentication processing in the authentication processing system in which the IC card intervenes, according to the present invention.

DESCRIPTION OF THE PREFERRED EMBODIMENTS

Figure 1:
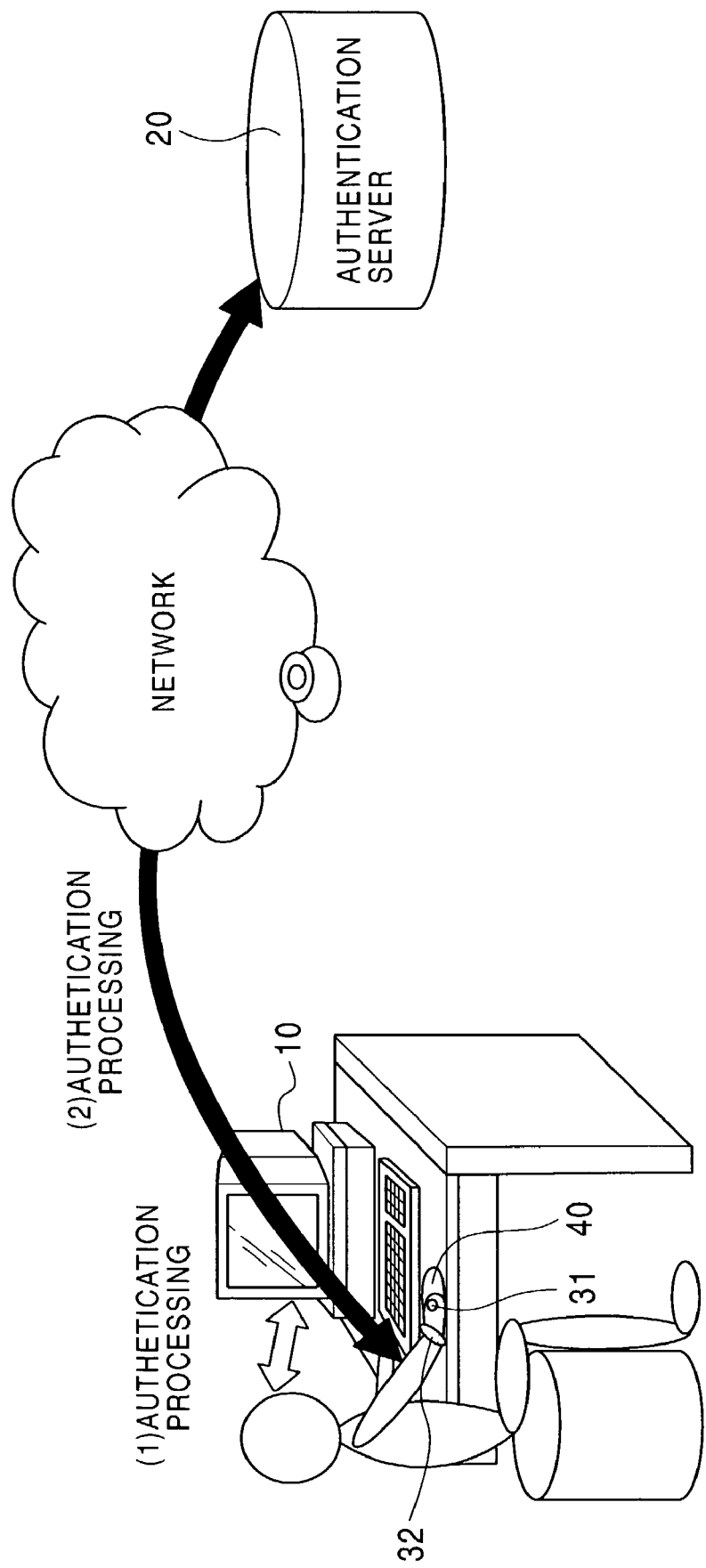
FIG. 1 is a view showing the processing structure of an authentication processing system according to the present invention.

FIG. 1 is a view showing outlines of an authentication processing system according to the present invention. The user wears a ring-type authentication device 31, a wrist-watch-type authentication device 32, or both. Each authentication device includes a tamperproof IC chip, has a function for executing mutual authentication processing by a common-key or public-key method, executes communication through a human body via a contact with the human body, and executes authentication processing with a machine, such as a personal computer 10, with which mutual authentication processing is executed. Alternatively, each authentication device performs communication with an authentication server 20 through a network via the personal computer 10 to execute authentication processing.

In addition, each authentication device has biometrics (living-body) information reading means, and reads living-body information of the user to execute authentication. The authentication device has stored in advance biometrics (living-body) information of the owner in a memory, and detects the correlation between the registered biometrics information and the read information, that is, checks the degree of data matching to determine whether the user is the owner. As biometrics information, blood vessel patterns in a finger where the ring-type authentication device 31 is mounted are used, or blood vessel patterns in a wrist where the wrist-watch-type authentication device 32 is mounted are used.

An individual authentication device according to the present invention has stored in advance blood-vessel-pattern information, for example, that were obtained at a finger where the ring-type authentication device 31 is mounted or that were obtained at a wrist where the wrist-watch-type authentication device 32 is mounted, of the registered user in a memory of the authentication device, and verifies the information with blood-vessel-pattern information read when authentication processing is executed to perform individual authentication according to whether they match.

Figure 2:
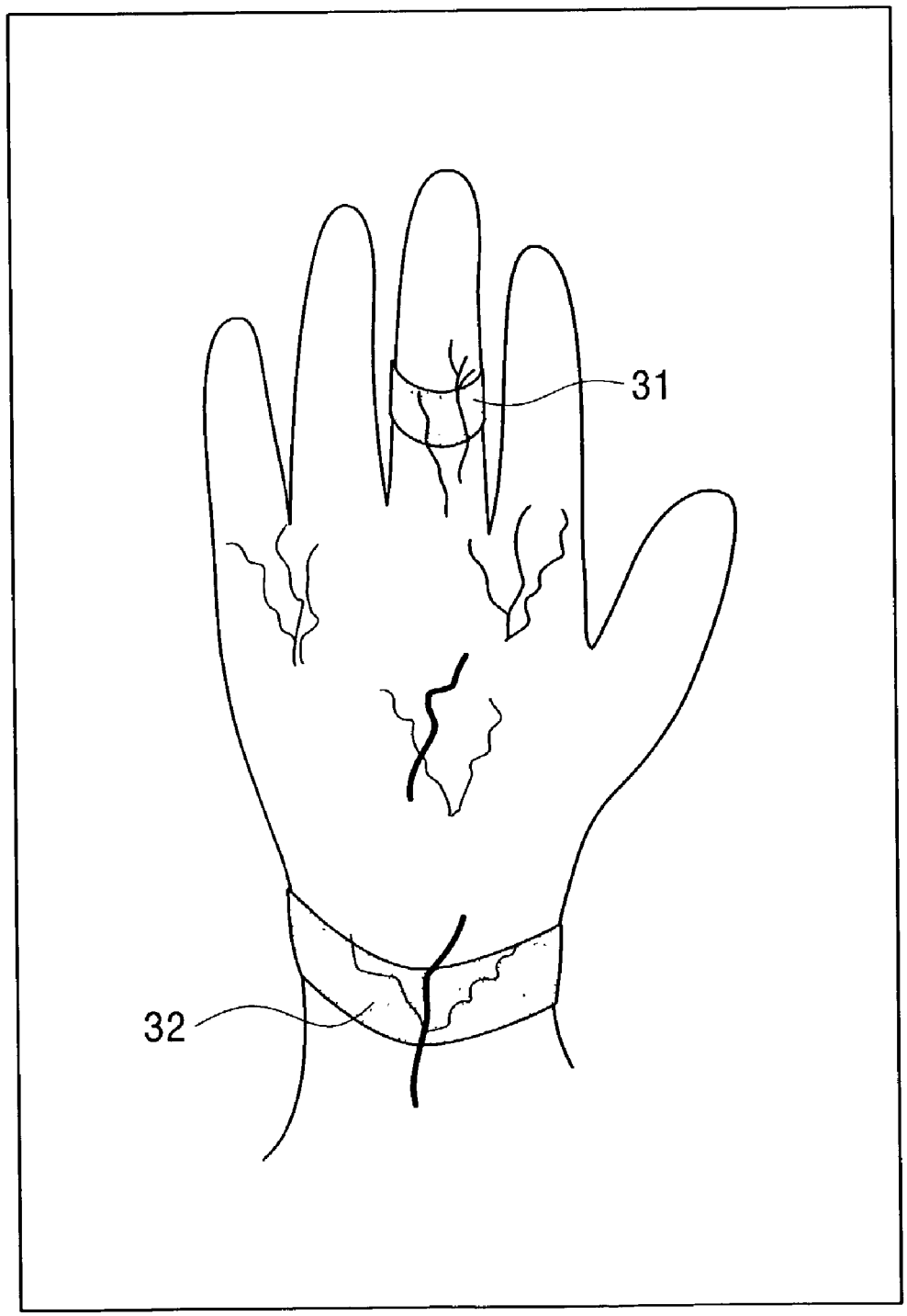
FIG. 2 is a view showing blood-vessel-pattern used for individual authentication in the authentication processing system according to the present invention.

It is known that the blood-vessel patterns of veins which are close to the skin surface of a human body are easily observed from the outside among blood vessels, and the patterns differ from person to person. For example, in a hand, blood-vessel patterns, especially vein patterns, unique to the individual are observed at positions, such as a finger, the wrist, the palm, and the back, as shown in FIG. 2. Blood vessel patterns differ from person to person, and they are effective information for identifying an individual. Structures for obtaining blood vessel patterns are disclosed, for example, in British Patent No. 2156127 and PCT Japanese Translation Patent Publication No. Hei-8-508419.

Blood vessel patterns can be read, for example, by an apparatus for emitting light to patterns and for reading reflected light, or an image reading apparatus for emitting infrared light to a finger or a wrist and for reading light passing through the inside thereof.

Figure 3A:
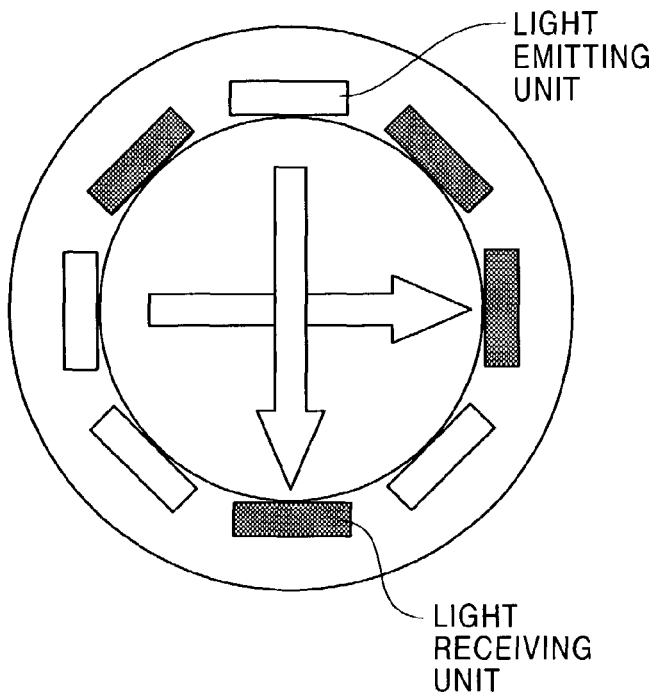
FIG. 3A and FIG. 3B are views showing the biometrics-information reading structures of an individual authentication device used in the authentication processing system according to the present invention.
Figure 3B:
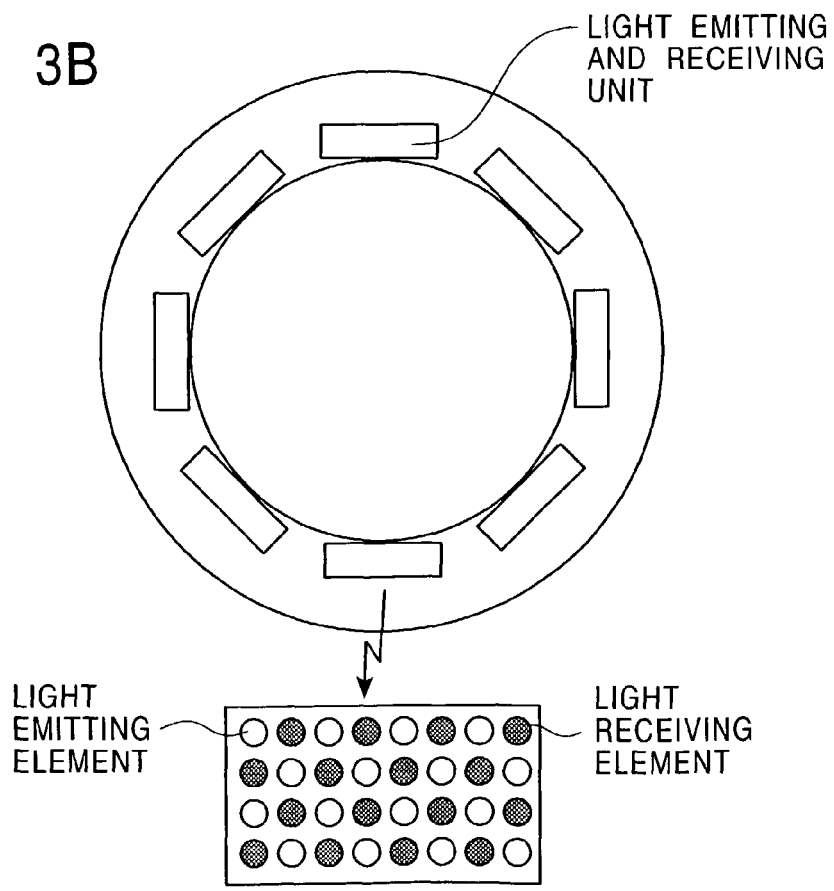

FIG. 3A shows an example structure of a ring-type authentication device or a wrist-watch-type authentication device in which light emitting units and light receiving units are disposed at opposite positions, and infrared light passing through the inside of a finger or a wrist is read. FIG. 3B shows an example structure of a ring-type authentication device or a wrist-watch-type authentication device in which light emitting elements and light receiving elements are disposed alternately as shown at the bottom and light is emitted and reflected light is read.

An authentication device that the user wears executes individual authentication by verifying blood-vessel patterns of a portion where the authentication device is mounted, and performs communication with an external unit through communication means to execute mutual authentication processing between the external unit and the authentication device. The mutual authentication processing is executed according to, for example, a common-key authentication processing method or a public-key authentication processing method. Details of these authentication processing will be described later.

Non-contact data transmission and receiving or data communication through a human body is performed between an authentication device that the user wears and an external unit with which the authentication device executes mutual authentication. When non-contact data transmission and receiving is performed, each of the authentication device and the external unit has an electromagnetic-wave transmitting and receiving section for transmitting and receiving an electromagnetic wave, and data generated by control means (such as a CPU) provided for each of the authentication device and the external unit is converted to an electromagnetic wave and transferred between the authentication device and the external unit in a non-contact manner.

When data communication through a human body is performed, the authentication device has a contact at its surface so as to contact the human body, and data is transferred between the external unit and the authentication device with the human body serving as a data transfer path via the contact, through a contact provided for the external unit.

For example, when a contact which contacts a human body is provided at a surface of a mouse connected to a PC, mutual authentication with the PC serving as an external unit is allowed through a connection line between the mouse and the PC. In addition, individual authentication with the use of biometrics information executed by the authentication device and mutual authentication between the authentication device and the PC are allowed in order to determine whether the PC has an access right. Further, authentication processing between an authentication server connected to the PC, and the authentication device also becomes possible.

The authentication devices 31 and 32 can be made as ornaments, such as a ring and a wrist watch. The contact formed on each of these devices is basically in a state very close to a state in which the contact always touches a human body or the contact is always electrically conductive with the human body. Since most parts of a human body can be regarded as electrically conductive containers made from salty water, they are generally conductors in a several-megahertz band. When the DC resistor between both hands is measured by a multimeter, it ranges from 500 kΩ to 2 or 3 MΩ depending on the states of the hands.

Figure 4A:
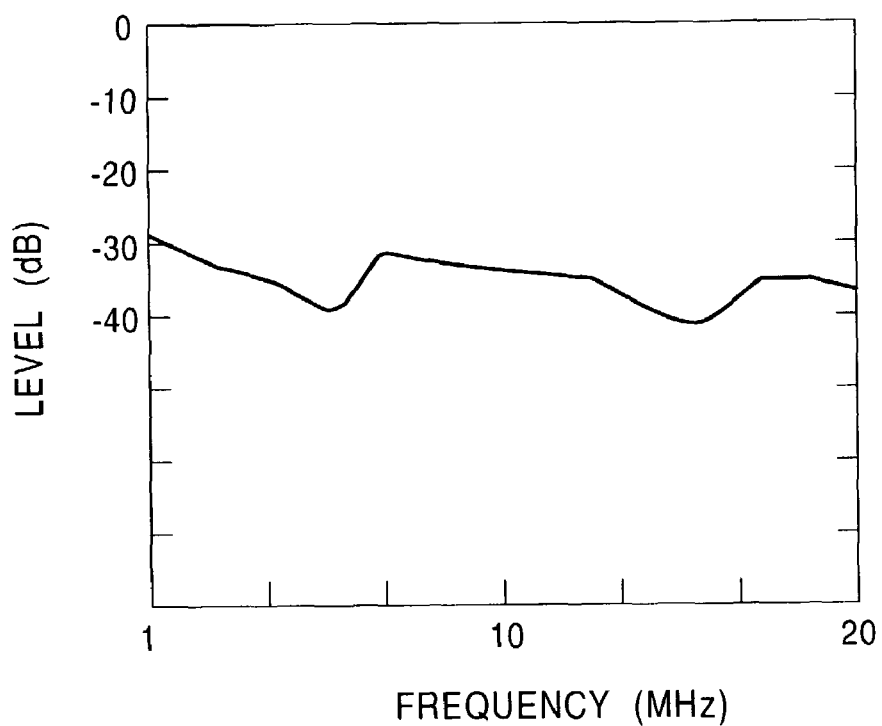
FIG. 4A and FIG. 4B are characteristic views showing human-body transfer characteristics (between both hands) measured by using a spectrum analyzer in ranges of 1 to 20 MHz and 1 to 30 MHz.
Figure 4B:
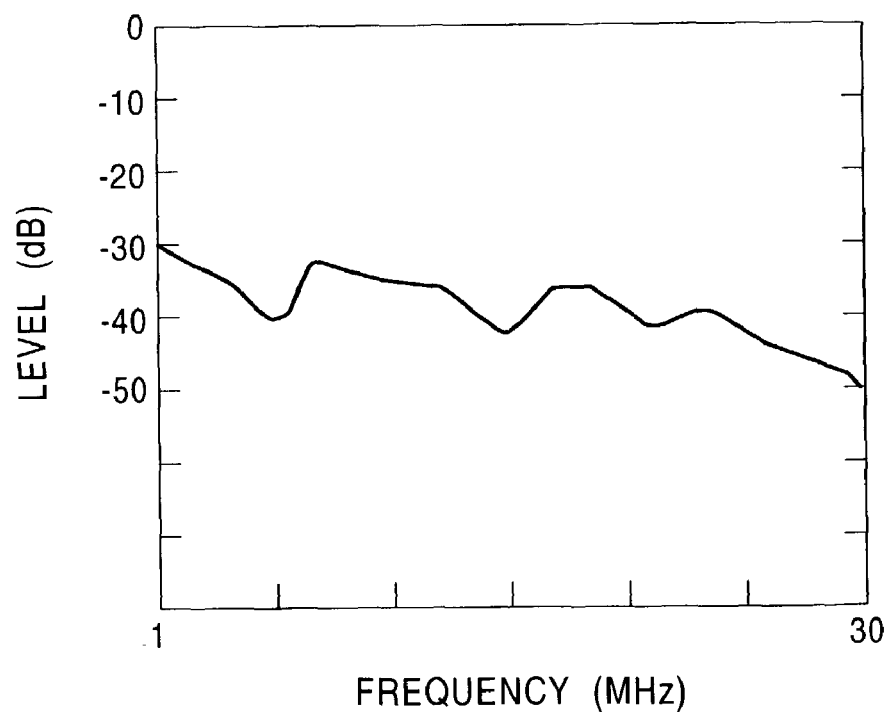

FIG. 4A and FIG. 4B shows AC transmission characteristics of a human body. FIG. 4A is a characteristic view showing a transmission characteristic (between both hands) of a human body measured by a spectrum analyzer in a range from 1 MHz to 20 MHz, and FIG. 4B is a characteristic view showing a transmission characteristic (between both hands) of a human body measured by a spectrum analyzer in a range from 1 MHz to 30 MHz. In both cases, a coaxial cable is connected to a tracking generator and the input terminal. The ground of the coaxial cable is connected to both units so that the cable does not serve as an antenna. As shown in FIG. 4A and FIG. 4B, the transmission characteristic in the range from 1 MHz to about 20 MHz is almost flat and has an attenuation of 30 dB to 40 dB.

In the measurements shown in FIG. 4A and FIG. 4B, the output impedance of the tracking generator and the input impedance of the spectrum analyzer are both 75Ω. Therefore, if the impedance between the both hands was, for example, 1 MΩ, the attenuation should reach −80 dB. The attenuation is actually much lower, showing a possibility of signal transfer through the human body.

A data transmitting side is regarded as a minute dipole antenna. The electromagnetic field generated by the data transmitting side has been sufficiently analyzed. According to the analysis, the electromagnetic field generated by a human body is that generated by a minute dipole antenna. The field strength is the sum of vector components in inverse proportion to the distance from the antenna, the square distance from the antenna, and the cube distance from the antenna, and the fields corresponding to the components are called a radiation electromagnetic field, an inductive electromagnetic field, and a static electromagnetic field. An expression indicating the relationship therebetween is described in detail in the Japanese Unexamined Patent Application Publication No. Hei-7-170215.

Figure 5A:
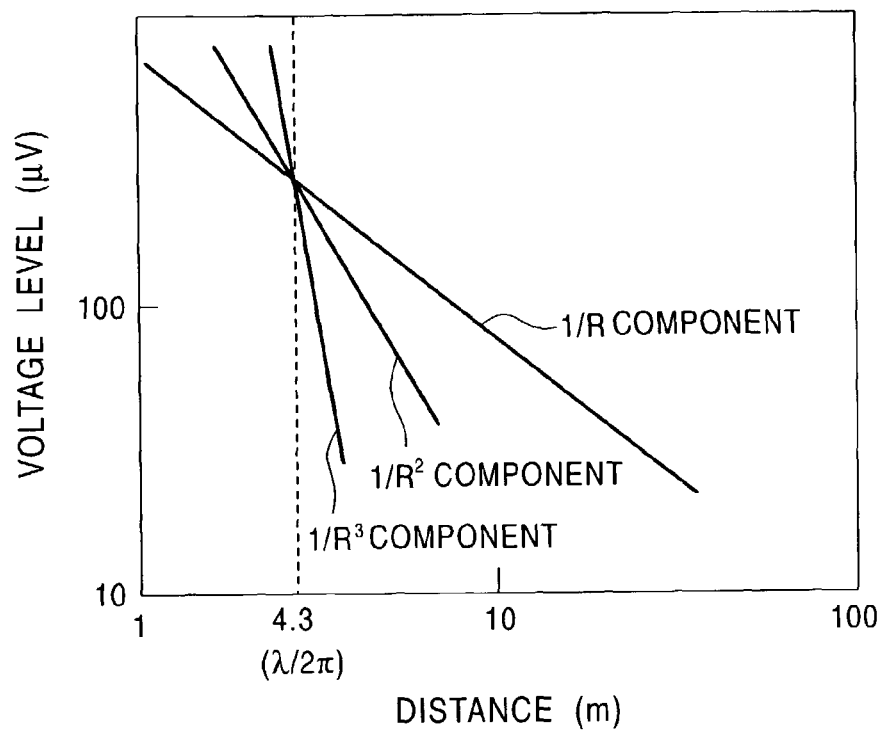
FIG. 5A and FIG. 5B are views showing field strengths.
Figure 5B:
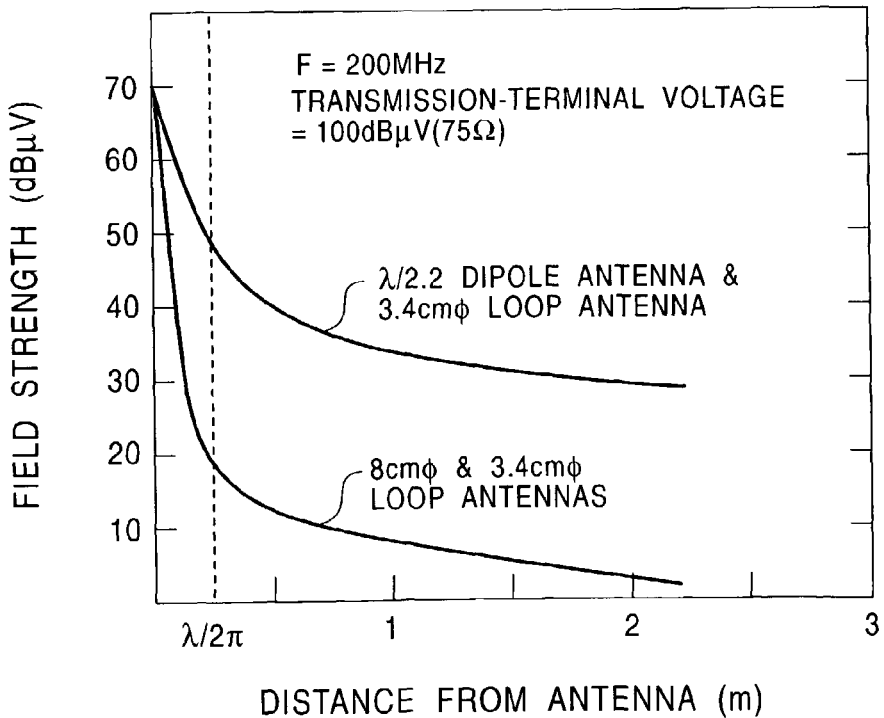

FIG. 5A and FIG. 5B show field strengths. FIG. 5A is a characteristic view showing the relationship between the field strengths of the above-described fields and the distance from the antenna. FIG. 5B is a view showing the relationship between the field strengths of and the distance from a $\lambda/2.2$ dipole antenna, a 3.4-cm-$\phi$ loop antenna, and a 8-cm-$\phi$ loop antenna in a condition in which the frequency f is set to 200 MHz and the transmission-terminal voltage is set to 100 dBµV (75Ω). As shown in FIG. 5A and FIG. 5B, the field strengths of the radiation electromagnetic field ($1/R$ component), the inductive electromagnetic field ($1/R^2$ co mponent), and the static electromagnetic field ($1/R^3$ component) are the same at a distance of $\lambda/2\pi$, and rapidly increase when the distance is shorter than that. When the frequency is set to 11 MHz, the point where the three field strengths are equal is about 4.3 m. It is preferred in a system according to the present invention that a transfer method which mainly uses a static electromagnetic field be applied.

It also is preferred that the field strength be selected in a usable range without applying the electromagnetic interference control specified in the radio law, for example, it is set to 500 µV/M or less at frequencies of 332 MHz or less.

As described above, the static electromagnetic field is attenuated in proportion to the cube distance. When the distance is changed from 1 m to 3 m, for example, the field strength is reduced by a factor of 1/27 ($1/(3\times3\times3)$). Therefore, when the distance from the data transmission means increases, the signal strength is extremely attenuated. Even if a plurality of users use similar apparatuses, it is unlikely that the signals of other users are regarded even as noise. Even when a plurality of users having similar apparatuses are close to each other, for example, successful communication is allowed by using the static electromagnetic field.

It is desirable that each authentication device include a contact having a large area. It is preferred that each authentication device can be wound around a finger or an arm as a wrist watch, a ring, or a bracelet, to contact the skin of a human body at a large area. In FIG. 1, as ornaments serving as authentication devices, only a wrist watch and a ring are shown. Things which a person usually wears in a contact manner can serve as authentication devices.

Figure 6:
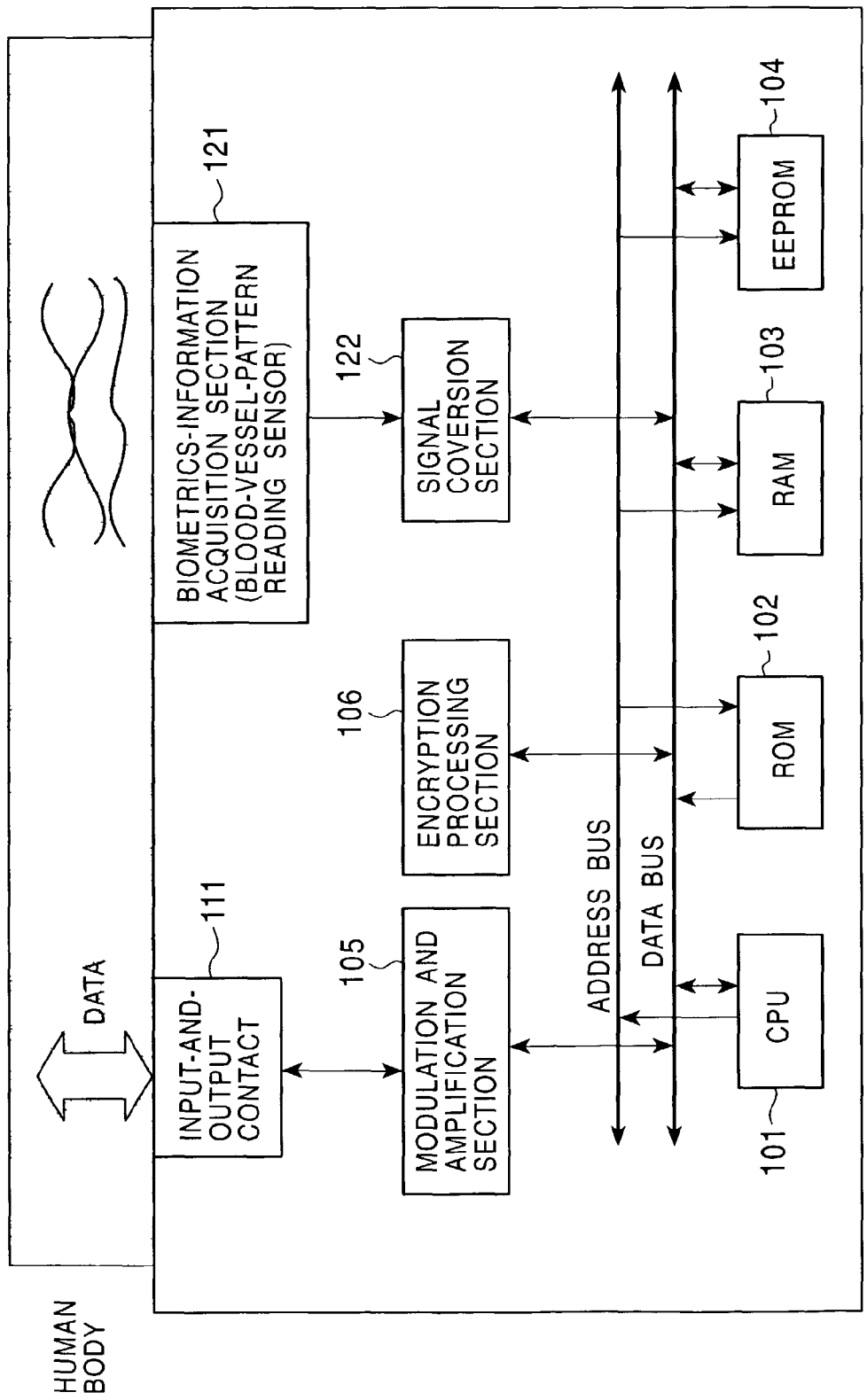
FIG. 6 is a view showing an example structure (first example) of an authentication device used in the authentication processing system according to the present invention.

FIG. 6 shows an example structure of an authentication device. A central processing unit (CPU) 101 executes an authentication processing program executed by the authentication device, and executes data transfer control for each processing section. A read only memory (ROM) 102 stores the program executed by the CPU 101 or fixed data serving as calculation parameters. A random access memory (RAM) 103 is used as a storage area and a work area for the program executed in the processing of the CPU 101 and parameters which change in program processing.

An EEPROM 104 stores registered data serving as verification data in individual authentication processing, and stores various keys used in mutual authentication processing with an external unit. The keys include, for example, a pair of the public key and the private key of the authentication device and a certificate-authority public-key certificate in a public-key authentication method, or a common key in a common-key authentication method. Details of authentication processing which uses these pieces of information will be described later.

An encryption processing section 106 executes encryption processing according to a mutual authentication processing method. For example, the encryption processing section 106 executes the data encryption standard (DES) algorithm, which belongs to the common-key encryption methods, or the elliptic curve cryptosystem (ECC) algorithm or the Rivest-Shamir-Adleman (RSA) encryption algorithm, which belong to the public-key encryption methods.

In the common-key encryption methods, an encryption key used for encrypting data and a decryption key used for decrypting the data are the same, the common key used for encryption and decryption is given to legitimate users, and illegitimate users, who do not have the key, are prevented from accessing the data. DES is a typical common-key encryption method. In public-key encryption methods, encryption performed by an encryption key and decryption performed by a decryption key use different algorithms. A public key that unspecified users can use is used. A document for a specified individual is encrypted by using a public key that the specified individual issues. The document encrypted by the public key can only be decrypted by the private key corresponding to the public key used for the encryption. The private key is owned only by the individual who issued the public key. Therefore, the document encrypted by the public key can be decrypted only by the individual who has the private key. The elliptic curve cryptosystem and the RSA encryption are typical public-key encryption methods.

The authentication device may be configured to be able to execute both a common-key encryption method and a public-key encryption method, or to execute one of them.

A human-body transfer signal is transmitted and received through an input-and-output contact 111. A modulation and amplification section 105 applies modulation and amplification. Human-body transfer is generally implemented in a range from 10 to 30 MHz. The modulation and amplification section 105 modulates a carrier to execute data transmission and receiving. Various modulation methods, such as FM modulation, which includes FSK modulation, AM modulation, which includes ASK modulation, and code modulation can be used.

An external unit with which mutual authentication is executed also is provided with a contact with a human body and a modulation and amplification section similar to that described above. When communication is performed through communication intervening means provided between a human body and a PC, such as the mouse 40 shown in FIG. 1, the mouse also is provided with a contact with the human body, and a modulation and amplification section similar to that described above, and intervenes in communication between the PC and the communication intervening means (mouse) and in communication between the contact of the communication intervening means (mouse) and the human body.

A biometrics-information acquisition section 121 has a structure for reading blood-vessel-patterns serving as biometrics information at a human-body portion in contact with or close to the structure and also has the light emitting units and light receiving units shown in FIG. 3. A signal conversion section 122 converts the biometrics information obtained by the biometrics-information acquisition section 121 to digital data that can be verified with registered data. The signal conversion section 122 converts, for example, the arrangement information of a plurality of blood vessels or the rates of blood vessels in thickness to digital data. The signal conversion section 122 converts the information to data which corresponds to verification data stored in the EEPROM 104. The authentication program is stored, for example, in the ROM 102, and executes a comparison between data obtained by the biometrics-information acquisition section 121 under the control of the CPU 101 and converted by the signal conversion section 122 with the verification data stored in the EEPROM 104.

Verification is executed according to the matching degree between user input data and the registered data. It is determined from the degree of correlation between both data and a threshold determined in advance for ascertaining whether the user is the registered user with a certain error being taken into consideration.

It is preferred that a long-life, compact power supply, although not shown, is used for the authentication device. For example, a lithium battery can be used. The CPU 101 receives electric power from the lithium battery, and executes various types of processing control, such as data reading, data transmission, data receiving, and data storage.

Figure 7:
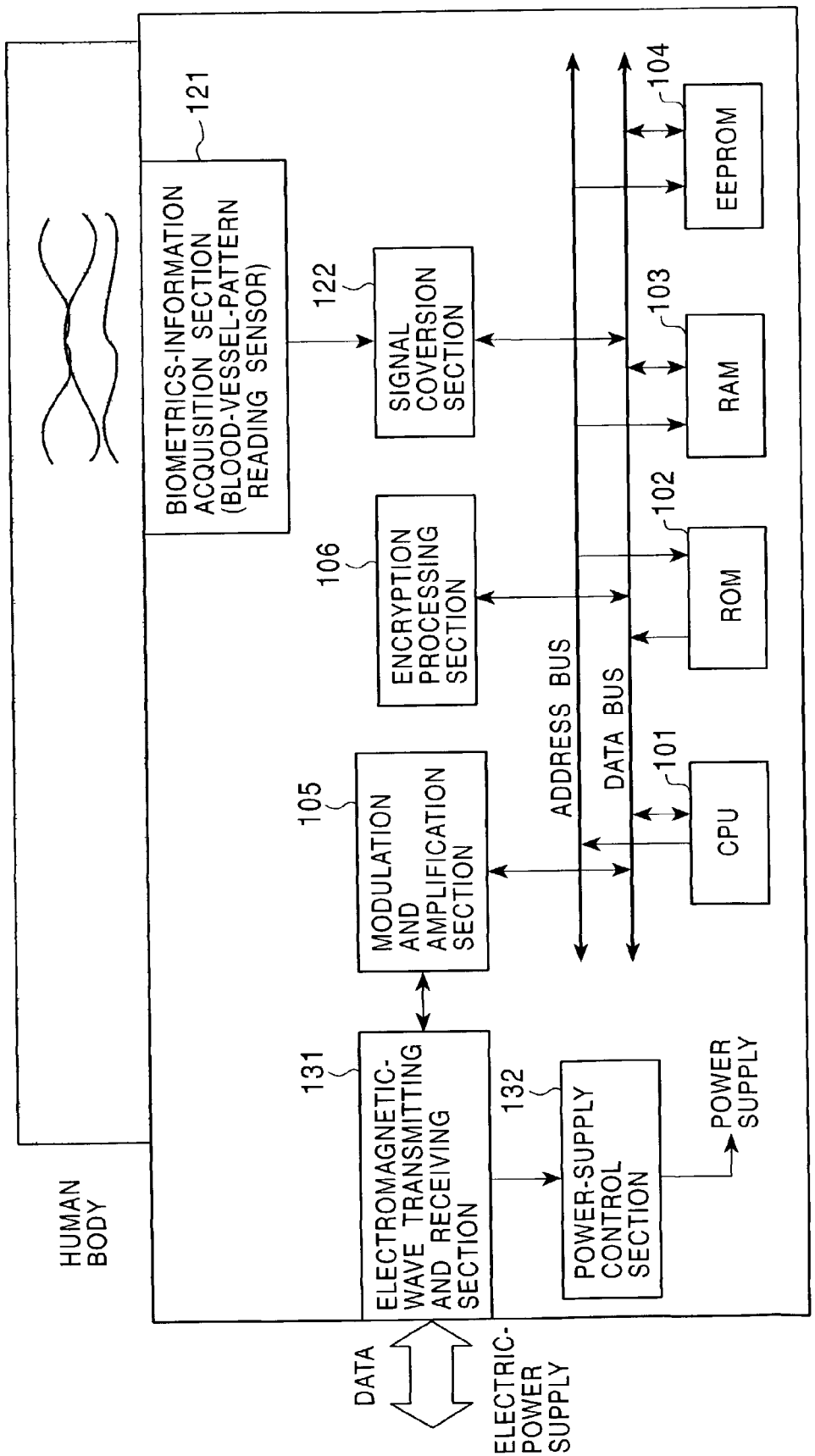
FIG. 7 is a view showing another example structure (second example) of the authentication device used in the authentication processing system according to the present invention.

FIG. 7 shows an example structure of an authentication device which transmits and receives data in a non-contact manner. An electromagnetic-wave transmitting and receiving section 131 performs non-contact data transmission and receiving. Data transfer with an external unit is executed through the electromagnetic-wave transmitting and receiving section 131. Data generated by control means (such as a CPU) in the authentication device and the external unit is modulated by a modulation and amplification section 105. An electromagnetic wave sent from the external unit is received by the electromagnetic-wave transmitting and receiving section 131, and it is rectified by a power-supply control section 132 to supply electric power required inside the authentication device. With this structure, it is not necessary to have a power supply inside the authentication device.

An authentication device according to the present invention obtains blood-vessel patterns at a portion where the authentication device is mounted and executes comparison processing with verification data stored in a memory in advance to perform individual authentication, and also performs data transfer with an external unit by data transfer through a human body or a non-contact electromagnetic field transfer to execute mutual authentication processing between the external unit and the authentication device. Mutual authentication can be executed between the external unit and the authentication device according to a public-key encryption method or a common-key encryption method. Authentication processing according to a public-key method will be described below in detail.

A case will be described by referring to FIG. 8 and other figures, in which the user who wears an authentication device uses a PC to connect to a server of a service provider through the Internet, executes individual authentication according to biometrics information by using the authentication device, and further executes mutual authentication according to a public-key encryption method between the authentication device and the server. The authentication device includes a structure for executing the elliptic curve cryptosystem (ECC) algorithm, which is a public-key encryption method. Authentication processing according to the elliptic curve cryptosystem (ECC) algorithm will be described. Processing according to a public-key method to which another algorithm is applied also can be executed.

Figure 8:
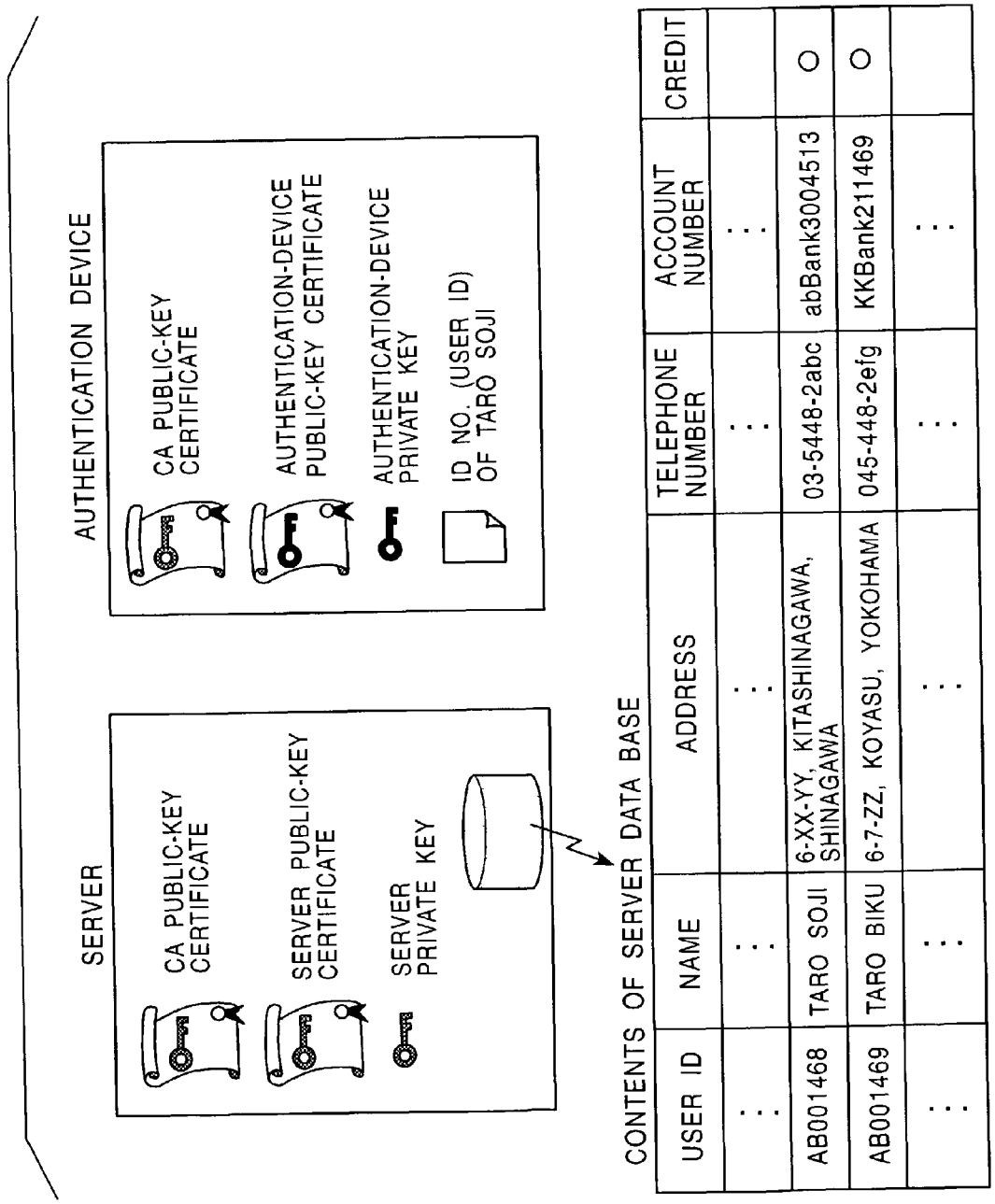
FIG. 8 is a view showing information stored in each unit when public-key-method authentication processing is executed in the authentication processing system according to the present invention.

As shown in FIG. 8, the authentication device stores the ID (user ID) of the user who owns the authentication device, in a memory (such as the EEPROM 104 show in FIG. 6 or FIG. 7). In addition, the authentication device stores a pair of the private key and a public-key certificate which stores the public key corresponding to the authentication device, and further stores a public-key certificate of the Certificate Authority (CA) which serves as an authentication station for public-key certificates.

An external unit (such as a server) to be authenticated stores a pair of the private key and a public-key certificate which stores the public key of the server, and further stores a public-key certificate of the Certificate Authority (CA) which serves as an authentication station for public-key certificates. The server also has a data base in which the user information of registered users is stored. The data base includes, for example, the name, the address, the telephone number, the account number, and the credit information of each user, associated with the user ID, as shown in the figure.

A processing sequence for executing individual authentication based on biometrics information in the authentication device and for executing mutual authentication by the public-key method between the authentication device and the server will be described by referring to FIG. 9 and FIG. 10.

Figure 9:
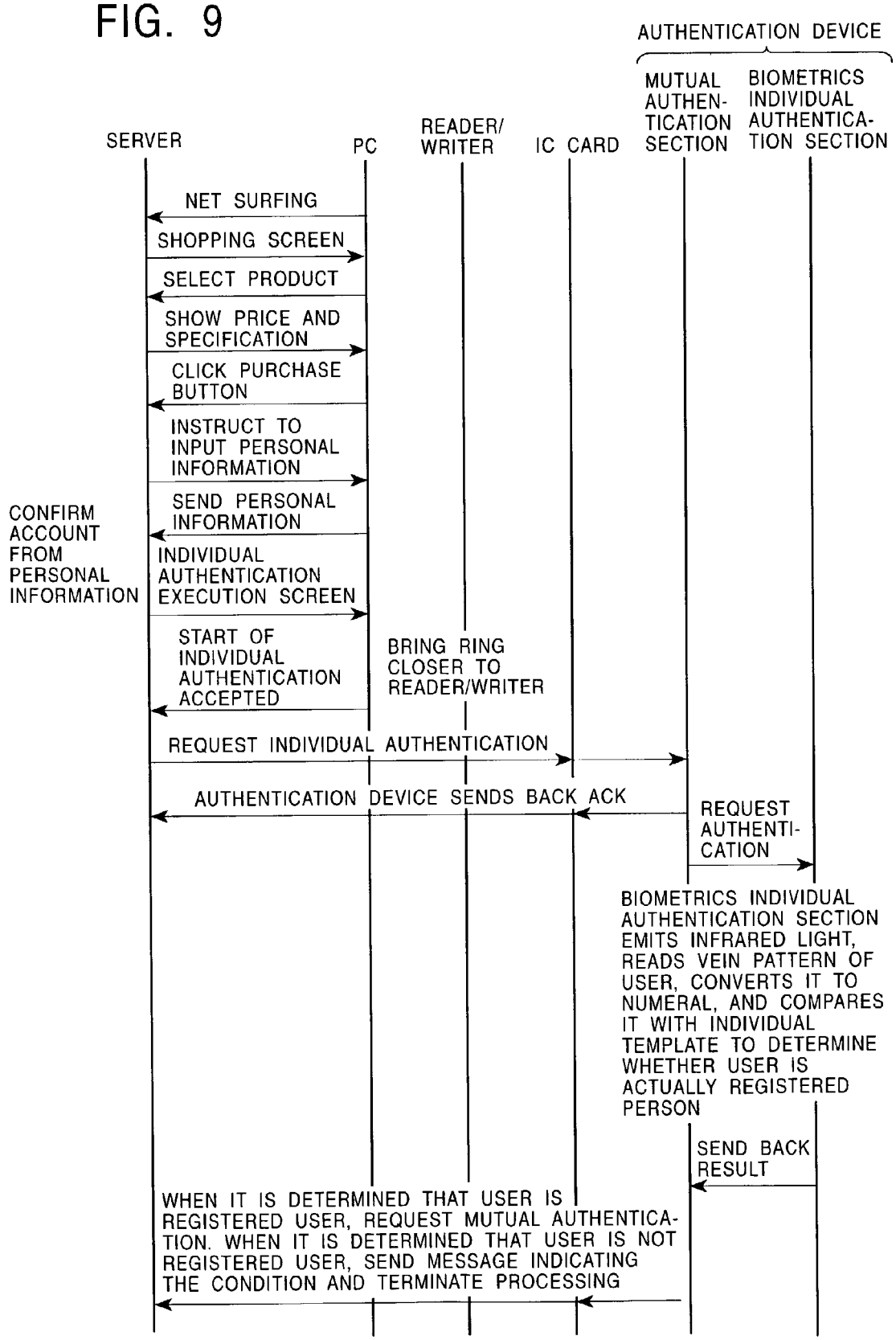
FIG. 9 is a view showing a sequence of the public-key-method authentication processing in the authentication processing system according to the present invention.
Figure 10:
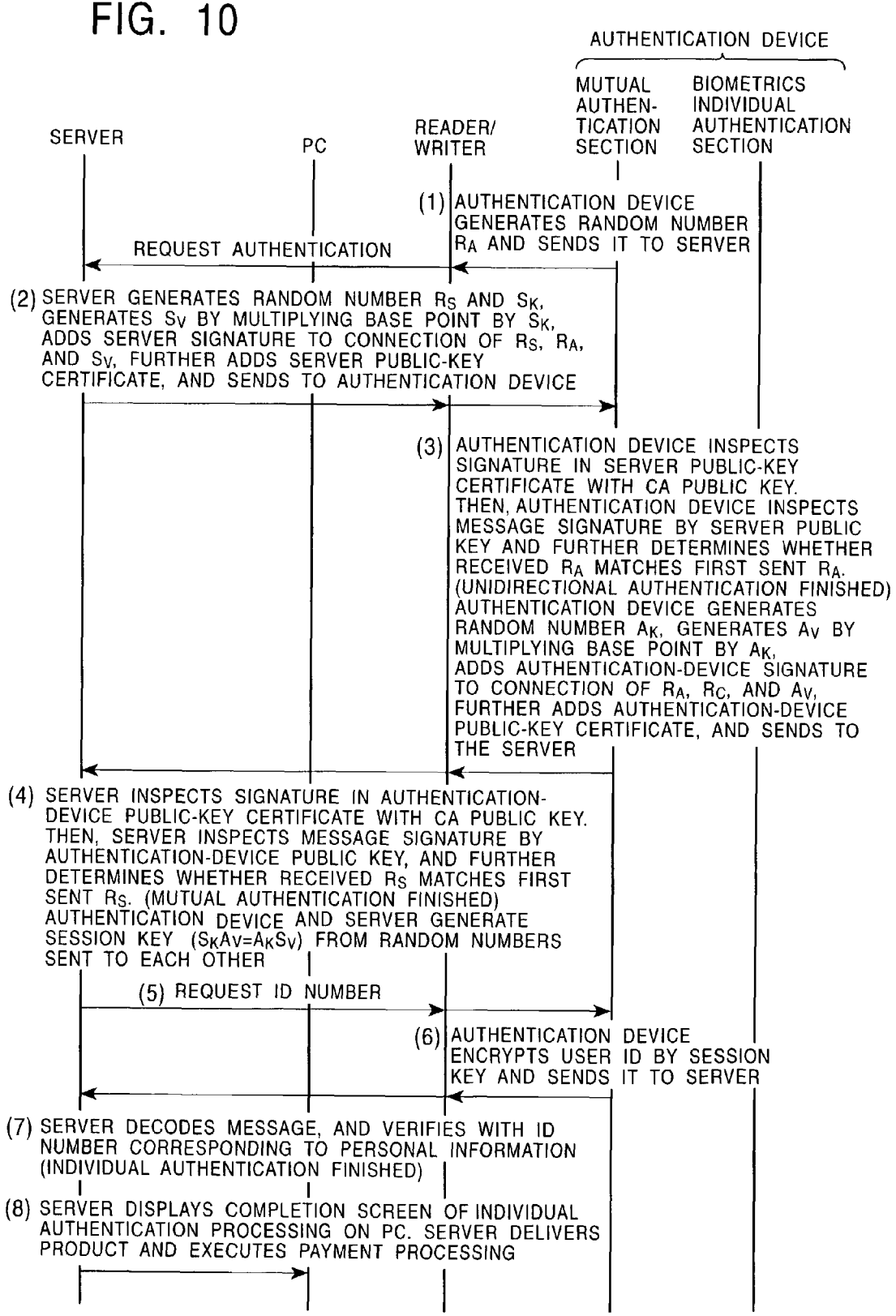
FIG. 10 is a view showing another sequence of the public-key-method authentication processing in the authentication processing system according to the present invention.

In FIG. 9 and FIG. 10, the processes executed by the following sections are shown from the left:

(1) Server as a communication destination with which authentication processing is performed.
(2) PC connected to the server and used by the user to be authenticated.
(3) Reader/writer which executes actual communication with the authentication device. The reader/writer corresponds, for example, to an apparatus having an electromagnetic-wave transmitting and receiving section for executing electromagnetic-field data communication without contact, or an apparatus (such as a mouse having a contact with a human body) for performing communication with a contact with a human body through the human body. The reader/writer is connected to the PC, for example, with a cable.
(4) Authentication device.

The process of the authentication device (4) is divided into that of an individual authentication section for executing an identification (authentication) of an individual according to biometrics information and that of a mutual authentication section for executing mutual authentication with an external unit (server in this case). The processes of these two processing sections are executed under the control of the CPU 101 serving as the control means of the authentication device shown in FIG. 6 or FIG. 7. The processing sections are not necessarily sections explicitly divided in the authentication device.

The user first operates the PC to connect to a desired server by net surfing, uses a browser on the PC to display a web page showing products for shopping, selects a product to be purchased among the displayed products by, for example, clicking a mouse, and sends data indicating that the user wants to purchase the product to the server. The server presents a screen in which detailed information, such as the price and the specification, of the specified product is included, to the user PC as a purchase-intention confirmation screen. The user decides to purchase it and clicks a purchase button displayed on the screen to send a purchase request indicating that the user has decided to purchase it to the server. When the server receives the purchase request, the server presents an input instruction screen in which personal information, such as a delivery-destination address, the name, and the telephone number, used for identifying the user is input. The user inputs data according to instructions and sends the data.

Then, a screen for selecting one of various types of payment methods is displayed on the browser of the PC. The user, for example, selects "directly charging to a bank account." The server refers to the bank account already known from the input personal information to determine whether it has been actually provided and payment is possible.

Then, the server presents an authentication execution screen on the browser of the PC and instructs the user to bring an authentication device, such as a ring, closer to the reader/writer so that data transmission and receiving is possible by using an electromagnetic field during authentication. In the present embodiment, a case (for the authentication device shown in FIG. 7) in which non-contact data transfer is made by using an electromagnetic field will be described. When the authentication device having the structure shown in FIG. 6, which performs data communication processing through a human body, is used, the user is instructed to allow data transfer through a mouse contact, for example, as described before, and setting of a data transfer ready state is executed.

When non-contact data transfer or data transfer through the human body has become ready, the user clicks at a start button to start individual authentication processing at that point of time.

As the authentication processing starts, the server sends an authentication processing request command to the authentication device through the PC and the reader/writer. The authentication device sends an acknowledgment (ACK) message in response to the command. The ACK message is sent to the PC and then to the server.

When the authentication device has sent the ACK message to the server, the biometrics individual authentication section starts biometrics individual authentication. The biometrics individual authentication section emits, for example, infrared light, reads the blood vessel pattern of the user, converts it to digital data, and compares it with an individual template serving as verification data stored in a memory of the authentication device to determine whether the user is actually the registered user. Verification is executed according to the degree of matching between user input data and the registered data. With an error being taken into consideration to some extent, the correlation degree of both data is compared with a predetermined threshold to determine whether the user is the registered user.

When it is determined as a result of verification that the user is the registered user, that is, when the individual authentication has been successfully performed, the authentication device sends a message requesting a transition to mutual authentication processing between the server and the authentication device, to the server. When it is determined as a result of verification that the user is not the registered user, that is, when the individual authentication has not been successfully performed, the authentication device sends a message to the server indicating that the individual has not been authenticated and terminates the processing without proceeding to the mutual authentication processing between the server and the authentication device.

FIG. 10 is a sequence view mainly showing a mutual authentication sequence (mutual authentication using a 160-bit elliptic curve cryptosystem) performed between the server and the authentication device by a public-key method. Details of the processing shown in FIG. 10 will be described.

First, (1) the authentication device generates a 64-bit random number Ra and sends it to the server.

(2) Then the server receives the random number Ra, and generates another 64-bit random number Rs and a random number Sk smaller than a prime number p. The server obtains a point Sv=Sk×G by multiplying a base point G by Sk, generates an electronic signature S.Sig with respect to Ra, Rs, and Sv (x coordinate and y coordinate), and sends back the electronic signature together with the server public-key certificate to the authentication device.

(3) The authentication device receives the server public-key certificate, Ra, Rs, Sv, and the electronic signature S.Sig, and determines whether the random number Ra sent from the server matches the random number Ra generated by the authentication device. When it is determined as a result that they match, the authentication device inspects the electronic signature in the server public-key certificate with the public key of the authentication station to take out the server public key. Then, the authentication device inspects the electronic signature S.Sig by the taken-out server public key.

Then, the authentication device generates a random number Ak smaller than the prime number p. The authentication device obtains a point Av=Ak×G by multiplying the base point G by Ak, generates an electronic signature A.Sig with respect to Ra, Rs, and Av (X coordinate and Y coordinate), and sends back the electronic signature together with the authentication-device public-key certificate to the server.

(4) The server receives the authentication-device public-key certificate, Ra, Rs, Av, and the electronic signature A.Sig, and determines whether the random number Rs sent from the authentication device matches the random number Rs generated by the server. When it is determined as a result that they match, the server inspects the electronic signature in the authentication-device public-key certificate with the public key of the authentication station to take out the authentication-device public key. Then, the server inspects the electronic signature A.Sig by the taken-out authentication-device public key. When the electronic signature has been successfully inspected, the server authenticates the authentication device as a legitimate one.

When both parties have successfully performed authentication, the authentication device calculates Ak×Sv (a calculation of multiplying a point on an ellipse by a scalar is required since Sv is a point on an ellipse although Ak is a random number), the server calculates Sk×Av, and both parties use the lower 64 bits of the X coordinate of the point as a session key (when a 64-bit common-key cryptosystem is used). The session key may also be generated from the Y coordinate. It may not be the lower 64 bits. In a private communication performed after the mutual authentication, transmission data are not only encrypted by the session key but also may be accompanied by an electronic signature.

When a fraud or an unmatch is found during the inspection of an electronic signature or received data, it is deemed that the mutual authentication has failed, and the processing is discontinued.

(5) Further, the server requests the authentication device to encrypt the user ID by the session key and send it.

(6) The authentication device encrypts the user ID by the session key and sends it.

(7) The server receives it, decodes it by the session key to take out the user ID, checks the information corresponding to the user ID stored in the data base (see FIG. 9) of the server, and (8) presents a confirmation screen for the address, the business account, and other information to the PC and shows the user that the delivery of the product and the execution of payment processing have been allowed.

As described above, in the structure of the present embodiment, the authentication device that the user wears first reads biometrics information and executes individual authentication by verification. Only when the individual authentication has been successfully performed according to the biometrics information, authentication with an external unit (such as a server) can be started. Then, only when both the individual authentication based on the biometrics information and the mutual authentication between the external unit (such as the server) and the authentication device have been successfully performed, subsequent data processing, such as payment processing, can be executed. Therefore, even if a fraudulent third party uses a stolen authentication device, because the party cannot satisfy the start condition of the authentication with the external server or a PC, fraudulent transactions and other illegitimate behaviors are effectively prevented.

In the above-described embodiment, the public-key method is used for the authentication between the server and the authentication device. A common-key authentication method also can be applied. When the common-key method is applied, it is necessary that the authentication device store a common key used for executing authentication in the common-key method.

In the above-described authentication processing case, the server is used as an external unit, and the mutual authentication with the server is executed. It also is possible that not a server but a PC operated by the user serves as an external unit to which mutual authentication is applied, and mutual authentication between the PC and the authentication device is executed when individual authentication has been successfully performed according to biometrics in the authentication device, in the same way as in the above-described processing sequence. In this case, storage data in the PC and PC processing are substituted for the storage data in the server and the server processing described by referring to FIG. 8 to FIG. 10.

Next, a data processing structure will be described in which an authentication processing sequence according to the present invention is used, an IC card which stores personal information, such as a credit-card number, in its memory is used as a first external unit, authentication between the IC card and an authentication device is executed, and, further, authentication is executed between a second external unit and the IC card.

Figure 11:
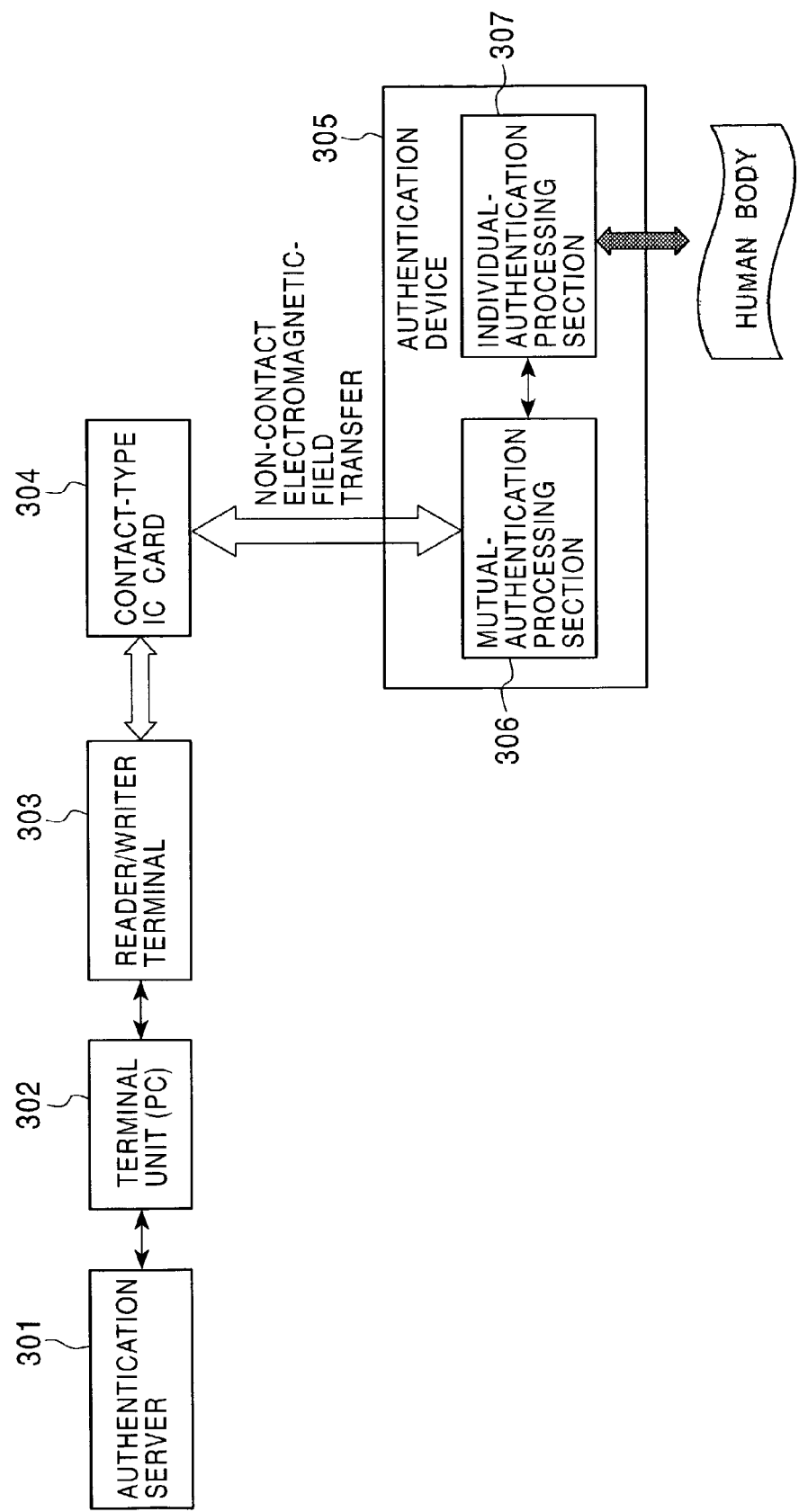
FIG. 11 is a view showing processing in which an IC card intervenes in the authentication system according to the present invention.

FIG. 11 shows an example data communication structure in which an authentication device according to the present invention, having both an individual authentication function based on biometrics information and a mutual authentication function between units, and an IC card which stores personal information such as a credit-card number are used.

In FIG. 11, an authentication device 305 has an individual-authentication processing section 307 having an individual-authentication function based on biometrics information and a mutual-authentication processing section 306 having a mutual authentication function for units, in the same way as described above. The authentication device 305 performs communication with an IC card 304 by electromagnetic-field transfer. The IC card 304 has an electromagnetic-wave transmitting and receiving section described by referring to FIG. 7;

and, it executes non-contact data transfer between the IC card and the authentication device. The IC card 304 has a CPU, a ROM, a RAM, an EEPROM, and a data communication section (interface); and, it has a function for executing mutual authentication processing, data communication, and data storage processing under the control of the CPU.

The IC card 304 is loaded into a reader/writer 303, and then data are read from or written into the IC card 304. The reader/writer 303 is connected to a PC 302 with a cable. An authentication server 301 and the PC 302 are connected by a network.

In the structure shown in FIG. 11, the user who wears the authentication device and has the IC card first executes individual authentication based on biometrics information in the authentication device, executes mutual authentication between the authentication device and the IC card by the public-key method, and then executes mutual authentication between the IC card and the server by the public-key method. Payment processing which uses a credit-card number recorded in the IC card will be described, the processing being performed only when the above authentications have been successfully performed. The authentication device and the IC card have structures which execute the elliptic curve cryptosystem (ECC) algorithm, which is a public-key encryption processing method. Authentication processing which uses the elliptic curve cryptosystem (ECC) algorithm will be described here. Processing which uses a public-key method to which another algorithm is applied also can be executed.

As shown in FIG. 12, the authentication device stores the ID (user ID) of the user who has the authentication device in a memory (such as the EEPROM 104 show in FIG. 7). In addition, the authentication device stores a pair of the private key and a public-key certificate which stores the public key corresponding to the authentication device; and it further stores a public-key certificate of the Certificate Authority (CA) which serves as an authentication station for public-key certificates.

The IC card also stores a pair of the private key and a public-key certificate which stores the public key corresponding to the IC card; and it further stores a public-key certificate of the Certificate Authority (CA) which serves as an authentication station for public-key certificates. In addition, the IC card stores personal information of the user, such as the address, the name, the telephone number, a credit-card number, and other information.

An external unit (such as a server) serving as an authentication destination stores a pair of the private key and a public-key certificate which stores the public key corresponding to the server; and it further stores a public-key certificate of the Certificate Authority (CA) which serves as an authentication station for public-key certificates.

A processing sequence for executing payment processing which uses a credit-card number included in the IC card only when individual authentication based on biometrics information in the authentication device, then, mutual authentication by the public-key method between the authentication device and the IC card, and then mutual authentication by the public-key method between the IC card and the server have been successfully performed will be described by referring to FIG. 13, FIG. 14, and FIG. 15.

Figure 13:
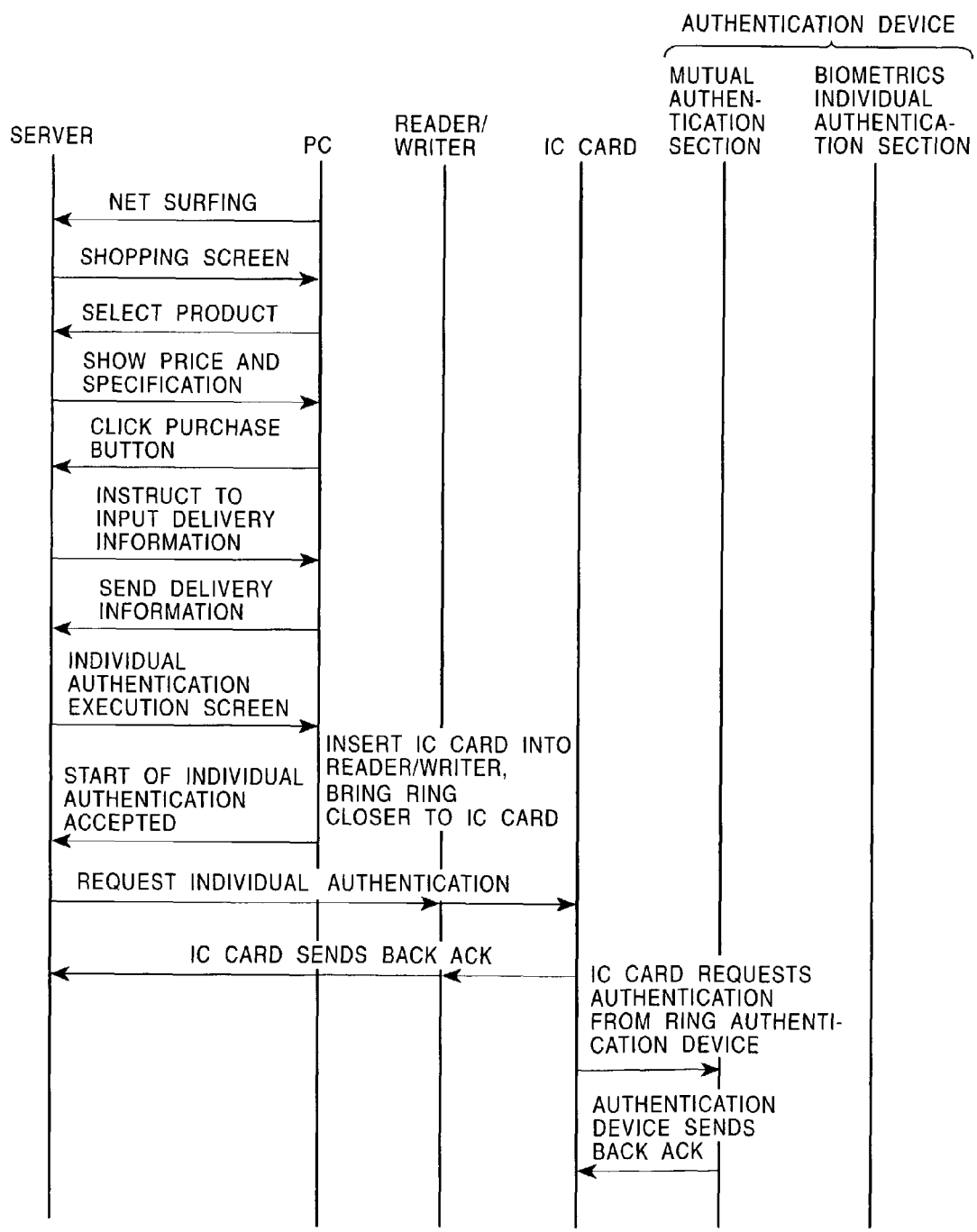
FIG. 13 is a view showing a sequence of the public-key-method authentication processing in the authentication processing system in which the IC card intervenes, according to the present invention.

In FIG. 13 to FIG. 15, processes executed by the following sections are shown from the left.
(1) Server as a communication destination with which authentication processing is performed.
(2) PC connected to the server and used by the user to be authenticated.
(3) Reader/writer which executes actual communication with the authentication device. An IC card is, for example, loaded into the reader/writer, and data are transferred between the IC card and the reader/writer.
(4) IC card that is loaded into the reader/writer, performs data transfer with the reader/writer, and performs non-contact data transfer with the authentication device.
(5) Authentication device.

In the same way as in the embodiment described before, the process of the authentication device (5) is divided into that of an individual authentication section for executing an identification (authentication) of an individual according to biometrics information and that of a mutual authentication section for executing mutual authentication with an external unit (server in this case). The processes of these two processing sections are executed under the control of the CPU 101 serving as the control means of the authentication device shown in FIG. 6 or FIG. 7. The processing sections are not necessarily sections explicitly divided in the authentication device.

The processing sequence will be described by first referring to FIG. 13. The user first operates the PC to connect to a desired server by net surfing, uses a browser on the PC to display a web page showing products for shopping, selects a product to be purchased among the displayed products by, for example, clicking a mouse, and sends data indicating that the user wants to purchase the product to the server. The server presents a screen in which detailed information, such as the price and the specification, of the specified product is included to the user PC as a purchase-intention confirmation screen. The user decides to purchase it and clicks a purchase button displayed on the screen to send a purchase request indicating that the user has decided to purchase it to the server. When the server receives the purchase request, the server presents an input instruction screen in which personal information, such as a delivery-destination address, the name, and the telephone number, used for identifying the user is input. The user inputs data according to instructions and sends the data.

Then, a screen for selecting one of various types of payment methods is displayed on the browser of the PC. The user, for example, selects "directly charging to a bank account." The server refers to the bank account already known from the input personal information to determine whether it has been actually provided and payment is possible.

Then, the server presents an authentication execution screen on the browser of the PC and instructs the user to insert the IC card into the reader/writer, bring an authentication device, such as a ring, closer to the IC card so that data transmission and receiving is possible by using an electromagnetic field.

As the authentication processing starts, the server sends an authentication processing request command to the IC card through the PC and the reader/writer. The IC card sends an acknowledgment (ACK) message in response to the command. The ACK message is sent to the PC and then to the server.

When the IC card has sent ACK to the server, the IC card sends an authentication processing request command to the authentication device. The authentication device sends an acknowledgment (ACK) message to the IC card in response to the command.

The processing proceeds to FIG. 14, and (a) individual authentication processing based on biometrics information is performed. The biometrics individual authentication section starts biometrics individual authentication. The biometrics individual authentication section emits, for example, infrared light, reads the blood vessel pattern of the user, converts it to digital data, and compares it with an individual template serving as verification data stored in a memory of the authentication device to determine whether the user is actually the registered user. Verification is executed according to a degree of matching between user input data and the registered data. With an error being taken into consideration to some extent, the correlation degree of both data is compared with a predetermined threshold to determine whether the user is the registered user.

When it is determined as a result of verification that the user is the registered user, that is, when the individual authentication has been successfully performed, the authentication device sends a message requesting a transition to mutual authentication processing between the IC card and the authentication device to the IC card. When it is determined as a result of verification that the user is not the registered user, that is, when the individual authentication has not been successfully performed, the authentication device sends a message indicating that the individual has not been authenticated to the IC card and terminates the processing without proceeding to mutual authentication processing between the IC card and the authentication device.

When (a) the individual authentication processing based on the biometrics information has been successfully performed, so that it is confirmed that the user who wears the authentication device is the owner of the authentication device, (b) mutual authentication processing is executed between the authentication device and the IC card.

First, (1) the authentication device generates a 64-bit random number Ra and sends it to the IC card.

(2) The IC card receives the random number Ra and generates another 64-bit random number Rc and a random number Ck smaller than a prime number p. The IC card obtains a point Cv=Ck×G by multiplying a base point G by Ck, generates an electronic signature C.Sig with respect to Rc, Ra, and Cv (x coordinate and y coordinate), and sends back the electronic signature together with the IC-card public-key certificate to the authentication device.

(3) The authentication device receives the IC-card public-key certificate, Rc, Ra, Cv, and the electronic signature C.Sig and determines whether the random number Ra sent from the IC card matches the random number Ra generated by the authentication device. When it is determined as a result that they match, the authentication device inspects an electronic signature in the IC-card public-key certificate with the public key of the authentication station to take out the IC-card public key. Then, the authentication device inspects the electronic signature C.Sig by the taken-out IC-card public key.

Then, the authentication device generates a random number Ak smaller than the prime number p. The authentication device obtains a point Av=Ak×G by multiplying the base point G by Ak, generates an electronic signature A.Sig with respect to Ra, Rc, and Av (X coordinate and Y coordinate) and sends back the electronic signature together with the authentication-device public-key certificate to the IC card.

(4) The IC card receives the authentication-device public-key certificate, Ra, Rc, Av, and the electronic signature A.Sig and determines whether the random number Rc sent from the authentication device matches the random number Rc generated by the IC card. When it is determined as a result that they match, the IC card inspects an electronic signature in the authentication-device public-key certificate with the public key of the authentication station to take out the authentication-device public key. Then, the IC card inspects the electronic signature A.Sig by the taken-out authentication-device public key. When the electronic signature has been successfully inspected, the IC card authenticates the authentication device as a legitimate one.

When both parties have successfully performed authentication, the authentication device calculates Ak×Cv (a calculation of multiplying a point on an ellipse by a scalar is required since Cv is a point on an ellipse although Ak is a random number), the IC card calculates Ck×Av, and both parties use the lower 64 bits of the X coordinate of the point as a session key (when a 64-bit common-key cryptosystem is used). The session keys also may be generated from Y coordinate. It may not be the lower 64 bits. In private communication performed after the mutual authentication, transmission data are not only encrypted by the session key but also may be accompanied by an electronic signature.

When a fraud or an unmatch is found during the inspection of an electronic signature or received data, it is deemed that the mutual authentication has failed, and the processing is discontinued.

(5) Further, the IC card requests the authentication device to encrypt the user ID by the session key and send it.

(6) The authentication device encrypts the user ID by the session key and sends it to the IC card.

(7) The IC card receives it, decodes it by the session key to take out the user ID, and verifies the user ID with that stored in its own memory. When the user ID matches that stored in the memory, the IC card requests the server to execute mutual authentication processing between the IC card and the server.

When (b) the mutual authentication processing described above has been successfully performed between the authentication device and the IC card, (c) mutual authentication processing is started between the IC card and the server.

First, (8) the IC card generates a 64-bit random number Rc2 and sends it to the server.

(9) The server receives the random number Rc2, and generates another 64-bit random number Rs and a random number Sk smaller than the prime number p. The server obtains a point Sv=Sk×G by multiplying the base point G by Sk, generates an electronic signature S.Sig with respect to Rc2, Rs, and Sv (x coordinate and y coordinate), and sends back the electronic signature together with the server public-key certificate to the IC card.

(10) The IC card receives the server public-key certificate, Rc2, Rs, Sv, and the electronic signature S.Sig, and determines whether the random number Rc2 sent from the server matches the random number Rc2 generated by the IC card. When it is determined as a result that they match, the IC card inspects an electronic signature in the server public-key certificate with the public key of the authentication station to take out the server public key. Then, the IC card inspects the electronic signature S.Sig by the taken-out server public key.

Then, the IC card generates a random number Ck2 smaller than the prime number p. The IC card obtains a point Cv2=Ck2×G by multiplying the base point G by Ck2, generates an electronic signature C.Sig with respect to Rc2, Rs, and Cv2 (X coordinate and Y coordinate), and sends back the electronic signature together with the IC-card public-key certificate to the server.

(11) The server receives the IC-card public-key certificate, Rc2, Rs, Cv2, and the electronic signature C.Sig and determines whether the random number Rs sent from the IC card matches the random number Rs generated by the server. When it is determined as a result that they match, the server inspects an electronic signature in the IC-card public-key certificate with the public key of the authentication station to take out the IC-card public key. Then, the server inspects the electronic signature C.Sig by the taken-out IC-card public key. When the electronic signature has been successfully inspected, the server authenticates the IC card as a legitimate one.

When both parties have successfully performed authentication, the IC card calculates Ck2×Sv (a calculation of multiplying a point on an ellipse by a scalar is required since Sv is a point on an ellipse although Ck2 is a random number), the server calculates Sk×Cv2, and both parties use the lower 64 bits of the X coordinate of the point as a session key (when a 64-bit common-key cryptosystem is used). The session key also may be generated from Y coordinate. It may not be the lower 64 bits. In private communication performed after the mutual authentication, transmission data are not only encrypted by the session key but also may be accompanied by an electronic signature.

When a fraud or an unmatch is found during the inspection of an electronic signature or received data, it is deemed that the mutual authentication has failed, and the processing is discontinued.

(12) Further, the server requests the IC card to encrypt personal information required for payment by the session key, such as a credit-card number, and sends it.

(13) The IC card encrypts personal information, such as a credit-card number, required for payment, by the session key and sends it.

(14) The server receives it, decodes it by the session key to take out the personal information required for payment, such as a credit-card number, and executes payment processing. The server also presents a confirmation screen for the address, the business account, and other information to the PC and shows the user that the delivery of the product and the execution of payment processing have been allowed.

As described above, in the structure of the present embodiment, the authentication device that the user wears first reads biometrics information and then executes individual authentication by verification. When the individual authentication is successfully performed according to the biometrics information, it is used as the start condition of authentication with the IC card which stores personal information required for payment, such as a credit-card number. Further, when the mutual authentication is successfully performed between the authentication device and the IC card, it is used as the start condition of authentication between the IC card and an external unit (such as a server).

More specifically, only when all authentications have been successfully performed, which includes the individual authentication based on the biometrics information, the mutual authentication between the IC card and the authentication device, and the mutual authentication between the IC card and the external unit (such as the server), subsequent data processing, such as payment processing, is executed. Therefore, even if a fraudulent third party uses a stolen authentication device, or obtains illegitimately an IC card which stores personal information, because the party cannot satisfy the start condition of authentication with the external server or a PC, fraudulent transactions and other illegitimate behaviors are effectively prevented.

Even if an IC card which stores various types of personal information is lost, because only when individual authentication executed by the authentication device and mutual authentication between the IC card and the authentication device have been successfully performed, subsequent processing is started, illegitimate processing by using by the lost IC card is not executed, and IC-card management having a high security level is implemented.

In the above-described embodiment, the public-key method is used for the authentication between the IC card and the authentication device and for the authentication between the IC card and the server. A common-key authentication method also can be applied. When a common-key method is applied, it is necessary that the authentication device and the IC card store the common key used for executing authentication in the common-key method.

In the above-described authentication processing case, the server is used as an external unit, and the mutual authentication with the server is executed. It also is possible that not a server but a PC operated by the user serves as an external unit to which mutual authentication is applied, and mutual authentication between the PC and the authentication device is executed only when individual authentication has been successfully performed according to biometrics in the authentication device, in the same way as in the above-described processing sequence. In this case, storage data in the PC and PC processing are substituted for the storage data in the server and the server processing described by referring to FIG. 12 to FIG. 15.

The present invention has been described in detail by referring to the specific embodiments. It is clearly understood, however, that a person skilled in the art can modify the embodiments or generate a substitute therefor within the scope of the present invention. In other words, the present invention has been disclosed in the form of showing examples, and it should not be interpreted in a limited way. To determine the gist of the present invention, claims of the present invention should be carefully examined.

The series of processing described in the specification can be executed by hardware, by software, or by a combination of both. When the series of processing is executed by software, it is possible that a program constituting the processing sequence can be installed into the memory of a computer that is built in special hardware and executed or into a general-purpose personal computer, which can execute various types of processing and executed.

For example, the program can be recorded in advance in a hard disk or a read only memory (ROM) serving as a recording medium. Alternatively, the program can be temporarily or perpetually stored (recorded) in a removable recording medium, such as a floppy disk, a compact disk read only memory (CD ROM), a magneto-optical (MO) disk, a digital versatile disk (DVD), a magnetic disk, or a semiconductor memory. Such a removable recording medium can be offered as so-called package software.

The program can be installed from a removable recording medium to a computer, as described above. In addition, it also is possible that the program can be transferred from a downloading site to a computer by radio transfer or to a computer through wire via a network, such as a local area network (LAN) or the Internet, and the computer receives the program transferred in that way and installs it into a recording medium, such as a built-in hard disk.

The various types of processing described in the present specification are not only executed in a time-sequential manner in a described order but also may be executed in parallel or independently depending on the processing capability of the apparatus which executes the processing as required. In the present specification, a system refers to a logical assembly of a plurality of apparatuses; and it is not limited to a system having apparatuses in the same cabinet.

What is claimed is:

1. An authentication processing method executed in a portable authentication device that includes an infrared light emitting unit used in executing the authentication processing, the method comprising:

obtaining biometrics information, comprising a vascular blood vessel pattern, of a person to be authenticated at a portion where the portable authentication device is mounted, wherein obtaining biometrics information reads the vascular blood vessel pattern in a finger or a wrist of the person to be authenticated;

executing an individual authentication process within the portable authentication device by the verification of the biometrics information with registered biometrics information stored in a memory of the portable authentication device;

receiving a request for individual authentication from an external device that is separate from the portable authentication device;

causing the infrared light emitting unit to emit infrared light in order to read the vascular blood vessel pattern of the person to be authenticated for the individual authentication process in response to receiving the request for individual authentication from the external device; and executing a mutual authentication process between the portable authentication device and the external device only when the individual authentication process has been successfully performed according to the biometrics information by the portable authentication device.

2. An authentication processing method according to claim 1, wherein the portable authentication device comprises a contact for data communication through a human body, and the portable authentication device executes the mutual authentication process with the external device by using data communication through the contact.

3. An authentication processing method according to claim 1, wherein the portable authentication device comprises an electromagnetic-wave transmitting and receiving section for non-contact data communication, and the portable authentication device executes the mutual authentication process with the external device by using data communication through the electromagnetic-wave transmitting and receiving section.

4. An authentication processing method according to claim 1, wherein the person to be authenticated wears the portable authentication device.

5. An authentication processing method according to claim 1, wherein the mutual authentication process between the portable authentication device and the external device is executed by one of a public-key method and a common-key method.

6. An authentication processing method according to claim 1, wherein the external device is an IC card owned by the same user as that of the portable authentication device, for storing personal information of the user and a user ID;

only when the individual authentication has been successfully performed according to the biometrics information by the portable authentication device, the mutual authentication process between the portable authentication device and the IC card is executed; and further, only when the mutual authentication process has been successfully performed, a second mutual authentication process is executed between the IC card and a second external device.

7. An authentication processing method according to claim 1, wherein after the mutual authentication process that follows the successful performance of the individual authentication process, the external device then performs a second mutual authentication process with a server, encrypts personal payment information of the person to be authenticated, and sends the encrypted personal payment information to the server pursuant to a payment process that is completed in conjunction with the second mutual authentication process.

8. A computer program product, comprising a non-transitory computer readable medium storing program code for executing authentication processing on a computer system, the program code being executed to provide authentication processing comprising:

obtaining biometrics information, comprising a vascular blood vessel pattern, of a person to be authenticated at a portion where a portable authentication device is mounted, wherein obtaining biometrics information reads the vascular blood vessel pattern of a finger or a wrist of the person to be authenticated;

executing an individual authentication process within the portable authentication device by the verification of the biometrics information with registered biometrics information stored in a memory of the portable authentication device;

receiving a request for individual authentication from an external device that is separate from the portable authentication device;

causing the infrared light emitting unit to emit infrared light in order to read the vascular blood vessel pattern of the person to be authenticated for the individual authentication process in response to receiving the request for individual authentication from the external device; and executing a mutual authentication process between the portable authentication device and the external device only when the individual authentication process has been successfully performed according to the biometrics information by the portable authentication device.

9. An authentication device, comprising:

a control unit configured to authenticate a person by biometrics, comprising a vascular blood vessel pattern information, to execute an individual authentication process by the verification with registered biometrics information stored in a memory of the authentication device, and to execute an authentication process with an external device that is separate from the authentication device only after the individual authentication process was successfully performed; and a contact connected to the control unit, wherein the biometrics information is obtained by the control unit executing data communications through a human body portion that contacts the contact.

10. An authentication device according to claim 9, further comprising:

a vascular blood vessel pattern reading unit configured to read the vascular blood vessel pattern at a portion of the body of the person to be authenticated.

11. An authentication device according to claim 10, wherein the portion of the body is a finger or a wrist.

* * * * *